US010320588B2

(12) United States Patent
Shokrollahi et al.

(10) Patent No.: US 10,320,588 B2
(45) Date of Patent: *Jun. 11, 2019

(54) VECTOR SIGNALING CODES WITH INCREASED SIGNAL TO NOISE CHARACTERISTICS

(71) Applicant: Kandou Labs, S.A., Lausanne (CH)

(72) Inventors: Amin Shokrollahi, Préverges (CH); Roger Ulrich, Bern (CH)

(73) Assignee: KANDOU LABS, S.A., Lausanne (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/898,209

(22) Filed: Feb. 15, 2018

(65) Prior Publication Data
US 2018/0176045 A1 Jun. 21, 2018

Related U.S. Application Data

(63) Continuation of application No. 14/796,443, filed on Jul. 10, 2015, now Pat. No. 9,900,186.
(Continued)

(51) Int. Cl.
*H04L 25/02* (2006.01)
*H04L 25/03* (2006.01)
(Continued)

(52) U.S. Cl.
CPC .... *H04L 25/0272* (2013.01); *H04L 25/03343* (2013.01); *H04L 25/14* (2013.01); *H04L 25/4919* (2013.01)

(58) Field of Classification Search
CPC . H04L 25/0272; H04L 25/4919; H04L 25/14; H04L 25/03343
See application file for complete search history.

(56) References Cited

U.S. PATENT DOCUMENTS

| 668,687 | A | 2/1901 | Mayer |
| 780,883 | A | 1/1905 | Hinchman |

(Continued)

FOREIGN PATENT DOCUMENTS

| CN | 1671092 | 9/2005 |
| CN | 1864346 | 11/2006 |

(Continued)

OTHER PUBLICATIONS

"Introduction to: Analog Computers and the DSPACE System," Course Material ECE 5230 Spring 2008, Utah State University, www.coursehero.com, 12 pages.
(Continued)

*Primary Examiner* — Berhanu Tadese
(74) *Attorney, Agent, or Firm* — Invention Mine LLC

(57) ABSTRACT

Vector signaling codes are synergistically combined with multi-level signaling, the increased alphabet size provided by the multi-level signaling enabling a larger codeword space for a given number of symbols, at the cost of reduced receiver detection margin for each of the multiple signal levels. Vector signaling code construction methods are disclosed in which code construction and selection of multi-level signal levels are coordinated with the design of an associated receive comparator network, wherein modified signal levels encoded and emitted by the transmitter result in increased detection margin at the receive comparators.

20 Claims, 16 Drawing Sheets

Related U.S. Application Data

(60) Provisional application No. 62/023,163, filed on Jul. 10, 2014.

(51) Int. Cl.
  *H04L 25/14* (2006.01)
  *H04L 25/49* (2006.01)

(56) References Cited

U.S. PATENT DOCUMENTS

| | | | |
|---|---|---|---|
| 3,196,351 A | 7/1965 | Slepian | |
| 3,392,442 A * | 7/1968 | Napier | B23K 1/19 228/122.1 |
| 3,636,463 A | 1/1972 | Ongkiehong | |
| 3,939,468 A | 2/1976 | Mastin | |
| 3,965,418 A * | 6/1976 | Bauer | H04M 3/28 324/99 D |
| 3,970,795 A * | 7/1976 | Allen | H04J 1/16 370/252 |
| 4,112,264 A * | 9/1978 | Abramson | H04L 43/50 324/103 P |
| 4,163,258 A | 7/1979 | Ebihara | |
| 4,181,967 A | 1/1980 | Nash | |
| 4,206,316 A | 6/1980 | Burnsweig | |
| 4,276,543 A | 6/1981 | Miller | |
| 4,414,512 A | 11/1983 | Nelson | |
| 4,486,739 A | 12/1984 | Franaszek | |
| 4,499,550 A | 2/1985 | Ray, III | |
| 4,722,084 A | 1/1988 | Morton | |
| 4,772,845 A | 9/1988 | Scott | |
| 4,774,498 A | 9/1988 | Traa | |
| 4,864,303 A | 9/1989 | Ofek | |
| 4,897,657 A | 1/1990 | Brubaker | |
| 4,974,211 A | 11/1990 | Corl | |
| 5,017,924 A | 5/1991 | Guiberteau | |
| 5,053,974 A | 10/1991 | Penz | |
| 5,150,384 A * | 9/1992 | Cahill | H04B 1/10 329/360 |
| 5,166,956 A | 11/1992 | Baltus | |
| 5,168,509 A | 12/1992 | Nakamura | |
| 5,266,907 A | 11/1993 | Dacus | |
| 5,283,761 A | 2/1994 | Gillingham | |
| 5,287,305 A | 2/1994 | Yoshida | |
| 5,311,516 A | 5/1994 | Kuznicki | |
| 5,331,320 A | 7/1994 | Cideciyan | |
| 5,412,689 A | 5/1995 | Chan | |
| 5,449,895 A | 9/1995 | Hecht | |
| 5,459,465 A | 10/1995 | Kagey | |
| 5,461,379 A | 10/1995 | Weinman | |
| 5,510,736 A | 4/1996 | Van De Plassche | |
| 5,511,119 A | 4/1996 | Lechleider | |
| 5,553,097 A | 9/1996 | Dagher | |
| 5,566,193 A | 10/1996 | Cloonan | |
| 5,599,550 A | 2/1997 | Kohlruss | |
| 5,626,651 A | 5/1997 | Dullien | |
| 5,629,651 A | 5/1997 | Mizuno | |
| 5,659,353 A | 8/1997 | Kostreski | |
| 5,727,006 A | 3/1998 | Dreyer | |
| 5,748,948 A | 5/1998 | Yu | |
| 5,798,563 A * | 8/1998 | Feilchenfeld | H01L 21/4857 174/255 |
| 5,802,356 A | 9/1998 | Gaskins | |
| 5,825,808 A | 10/1998 | Hershey | |
| 5,856,935 A | 1/1999 | Moy | |
| 5,875,202 A | 2/1999 | Venters | |
| 5,881,130 A * | 3/1999 | Zhang | G01R 27/08 324/527 |
| 5,945,935 A | 8/1999 | Kusumoto | |
| 5,949,060 A | 9/1999 | Schattschneider | |
| 5,982,954 A | 11/1999 | Delen | |
| 5,995,016 A | 11/1999 | Perino | |
| 6,005,895 A | 12/1999 | Perino | |
| 6,084,883 A | 7/2000 | Norrell | |
| 6,084,958 A * | 7/2000 | Blossom | H04M 1/58 379/352 |
| 6,097,732 A * | 8/2000 | Jung | H04L 1/0002 370/466 |
| 6,119,263 A | 9/2000 | Mowbray | |
| 6,172,634 B1 | 1/2001 | Leonowich | |
| 6,175,230 B1 | 1/2001 | Hamblin | |
| 6,232,908 B1 | 5/2001 | Nakaigawa | |
| 6,278,740 B1 | 8/2001 | Nordyke | |
| 6,316,987 B1 | 11/2001 | Dally | |
| 6,346,907 B1 | 2/2002 | Dacy | |
| 6,359,931 B1 | 3/2002 | Perino | |
| 6,378,073 B1 | 4/2002 | Davis | |
| 6,384,758 B1 | 5/2002 | Michalski | |
| 6,398,359 B1 | 6/2002 | Silverbrook | |
| 6,404,820 B1 | 6/2002 | Postol | |
| 6,417,737 B1 | 7/2002 | Moloudi | |
| 6,424,630 B1 * | 7/2002 | Ang | H04L 25/06 370/251 |
| 6,433,800 B1 | 8/2002 | Holtz | |
| 6,452,420 B1 | 9/2002 | Wong | |
| 6,473,877 B1 | 10/2002 | Sharma | |
| 6,483,828 B1 | 11/2002 | Balachandran | |
| 6,504,875 B2 | 1/2003 | Perino | |
| 6,509,773 B2 | 1/2003 | Buchwald | |
| 6,522,699 B1 | 2/2003 | Anderson | |
| 6,556,628 B1 | 4/2003 | Poulton | |
| 6,563,382 B1 | 5/2003 | Yang | |
| 6,621,427 B2 | 9/2003 | Greenstreet | |
| 6,624,699 B2 | 9/2003 | Yin | |
| 6,650,638 B1 | 11/2003 | Walker | |
| 6,661,355 B2 | 12/2003 | Cornelius | |
| 6,664,355 B2 | 12/2003 | Kim | |
| 6,686,879 B2 | 2/2004 | Shattil | |
| 6,690,739 B1 | 2/2004 | Mui | |
| 6,766,342 B2 | 7/2004 | Kechriotis | |
| 6,772,351 B1 | 8/2004 | Werner | |
| 6,839,429 B1 | 1/2005 | Gaikwad | |
| 6,839,587 B2 | 1/2005 | Yonce | |
| 6,854,030 B2 | 2/2005 | Perino | |
| 6,865,234 B1 | 3/2005 | Agazzi | |
| 6,865,236 B1 | 3/2005 | Terry | |
| 6,876,317 B2 | 4/2005 | Sankaran | |
| 6,898,724 B2 | 5/2005 | Chang | |
| 6,927,709 B2 | 8/2005 | Kiehl | |
| 6,954,492 B1 | 10/2005 | Williams | |
| 6,963,622 B2 | 11/2005 | Eroz | |
| 6,972,701 B2 | 12/2005 | Jansson | |
| 6,973,613 B2 | 12/2005 | Cypher | |
| 6,976,194 B2 | 12/2005 | Cypher | |
| 6,982,954 B2 | 1/2006 | Dhong | |
| 6,990,138 B2 | 1/2006 | Bejjani | |
| 6,993,311 B2 | 1/2006 | Li | |
| 6,999,516 B1 | 2/2006 | Rajan | |
| 7,023,817 B2 | 4/2006 | Kuffner | |
| 7,039,136 B2 | 5/2006 | Olson | |
| 7,053,802 B2 | 5/2006 | Cornelius | |
| 7,075,996 B2 | 7/2006 | Simon | |
| 7,080,288 B2 | 7/2006 | Ferraiolo | |
| 7,082,557 B2 | 7/2006 | Schauer | |
| 7,085,153 B2 | 8/2006 | Ferrant | |
| 7,085,336 B2 | 8/2006 | Lee | |
| 7,127,003 B2 | 10/2006 | Rajan | |
| 7,130,944 B2 | 10/2006 | Perino | |
| 7,142,612 B2 | 11/2006 | Horowitz | |
| 7,142,865 B2 | 11/2006 | Tsai | |
| 7,164,631 B2 | 1/2007 | Tateishi | |
| 7,167,019 B2 | 1/2007 | Broyde | |
| 7,176,823 B2 | 2/2007 | Zabroda | |
| 7,180,949 B2 | 2/2007 | Kleveland | |
| 7,184,483 B2 | 2/2007 | Rajan | |
| 7,199,728 B2 | 4/2007 | Dally | |
| 7,231,558 B2 | 6/2007 | Gentieu | |
| 7,269,130 B2 | 9/2007 | Pitio | |
| 7,269,212 B1 | 9/2007 | Chau | |
| 7,335,976 B2 | 2/2008 | Chen | |
| 7,336,112 B1 | 2/2008 | Sha | |
| 7,339,990 B2 | 3/2008 | Hidaka | |
| 7,346,819 B2 | 3/2008 | Bansal | |

(56) References Cited

U.S. PATENT DOCUMENTS

| | | |
|---|---|---|
| 7,348,989 B2 | 3/2008 | Stevens |
| 7,349,484 B2 | 3/2008 | Stojanovic |
| 7,356,213 B1 | 4/2008 | Cunningham |
| 7,358,869 B1 | 4/2008 | Chiarulli |
| 7,362,130 B2 | 4/2008 | Broyde |
| 7,362,697 B2 | 4/2008 | Becker |
| 7,366,942 B2 | 4/2008 | Lee |
| 7,370,264 B2 | 5/2008 | Worley |
| 7,372,390 B2 | 5/2008 | Yamada |
| 7,389,333 B2 | 6/2008 | Moore |
| 7,397,302 B2 | 7/2008 | Bardsley |
| 7,400,276 B1 | 7/2008 | Sotiriadis |
| 7,428,273 B2 | 9/2008 | Foster |
| 7,456,778 B2 | 11/2008 | Werner |
| 7,462,956 B2 | 12/2008 | Lan |
| 7,496,162 B2 | 2/2009 | Srebranig |
| 7,570,704 B2 | 4/2009 | Nagarajan |
| 7,535,957 B2 | 5/2009 | Ozawa |
| 7,539,532 B2 | 5/2009 | Tran |
| 7,583,209 B1 * | 9/2009 | Duan .................. H03M 5/14 341/50 |
| 7,599,390 B2 | 10/2009 | Pamarti |
| 7,613,234 B2 | 11/2009 | Raghavan |
| 7,616,075 B2 | 11/2009 | Kushiyama |
| 7,620,116 B2 | 11/2009 | Bessios |
| 7,633,850 B2 | 12/2009 | Nagarajan |
| 7,639,596 B2 | 12/2009 | Cioffi |
| 7,643,588 B2 | 1/2010 | Visalli |
| 7,650,525 B1 | 1/2010 | Chang |
| 7,656,321 B2 | 2/2010 | Wang |
| 7,694,204 B2 | 4/2010 | Schmidt |
| 7,697,915 B2 | 4/2010 | Behzad |
| 7,698,088 B2 | 4/2010 | Sul |
| 7,706,456 B2 | 4/2010 | Laroia |
| 7,706,524 B2 | 4/2010 | Zerbe |
| 7,746,764 B2 | 6/2010 | Rawlins |
| 7,768,312 B2 | 8/2010 | Hirose |
| 7,787,572 B2 | 8/2010 | Scharf |
| 7,804,361 B2 | 9/2010 | Lim |
| 7,808,456 B2 | 10/2010 | Chen |
| 7,808,883 B2 | 10/2010 | Green |
| 7,841,909 B2 | 11/2010 | Murray |
| 7,869,497 B2 | 1/2011 | Benvenuto |
| 7,869,546 B2 | 1/2011 | Tsai |
| 7,882,413 B2 | 2/2011 | Chen |
| 7,899,653 B2 | 3/2011 | Hollis |
| 7,907,676 B2 | 3/2011 | Stojanovic |
| 7,933,770 B2 | 4/2011 | Kruger |
| 8,000,664 B2 | 8/2011 | Khorram |
| 8,030,999 B2 | 10/2011 | Chatterjee |
| 8,036,300 B2 | 10/2011 | Evans |
| 8,050,332 B2 | 11/2011 | Chung |
| 8,055,095 B2 | 11/2011 | Palotai |
| 8,064,535 B2 | 11/2011 | Wiley |
| 8,085,172 B2 | 12/2011 | Li |
| 8,091,006 B2 | 1/2012 | Prasad |
| 8,106,806 B2 | 1/2012 | Toyomura |
| 8,149,906 B2 | 4/2012 | Saito |
| 8,159,375 B2 | 4/2012 | Abbasfar |
| 8,159,376 B2 | 4/2012 | Abbasfar |
| 8,180,931 B2 | 5/2012 | Lee |
| 8,185,807 B2 | 5/2012 | Oh |
| 8,199,849 B2 | 6/2012 | Oh |
| 8,199,863 B2 | 6/2012 | Chen |
| 8,218,670 B2 | 7/2012 | AbouRjeily |
| 8,233,544 B2 | 7/2012 | Bao |
| 8,245,094 B2 | 8/2012 | Jiang |
| 8,253,454 B2 | 8/2012 | Lin |
| 8,279,094 B2 | 10/2012 | Abbasfar |
| 8,279,745 B2 | 10/2012 | Dent |
| 8,289,914 B2 | 10/2012 | Li |
| 8,295,250 B2 | 10/2012 | Gorokhov |
| 8,295,336 B2 | 10/2012 | Lutz |
| 8,305,247 B2 | 11/2012 | Pun |
| 8,310,389 B1 | 11/2012 | Chui |
| 8,341,492 B2 | 12/2012 | Shen |
| 8,359,445 B2 | 1/2013 | Ware |
| 8,365,035 B2 | 1/2013 | Hara |
| 8,406,315 B2 | 3/2013 | Tsai |
| 8,406,316 B2 | 3/2013 | Sugita |
| 8,429,492 B2 | 4/2013 | Yoon |
| 8,429,495 B2 | 4/2013 | Przybylski |
| 8,437,440 B1 | 5/2013 | Zhang |
| 8,442,099 B1 | 5/2013 | Sederat |
| 8,442,210 B2 | 5/2013 | Zerbe |
| 8,443,223 B2 | 5/2013 | Abbasfar |
| 8,451,913 B2 | 5/2013 | Oh |
| 8,462,891 B2 | 6/2013 | Kizer |
| 8,472,513 B2 | 6/2013 | Malipatil |
| 8,620,166 B2 | 6/2013 | Dong |
| 8,498,344 B2 | 7/2013 | Wilson |
| 8,498,368 B1 | 7/2013 | Husted |
| 8,520,348 B2 | 8/2013 | Dong |
| 8,520,493 B2 | 8/2013 | Goulahsen |
| 8,539,318 B2 | 9/2013 | Cronie |
| 8,547,272 B2 | 10/2013 | Nestler |
| 8,577,284 B2 | 11/2013 | Seo |
| 8,578,246 B2 | 11/2013 | Mittelholzer |
| 8,588,254 B2 | 11/2013 | Diab |
| 8,588,280 B2 | 11/2013 | Oh |
| 8,593,305 B1 | 11/2013 | Tajalli |
| 8,602,643 B2 | 12/2013 | Gardiner |
| 8,604,879 B2 | 12/2013 | Mourant |
| 8,638,241 B2 | 1/2014 | Sudhakaran |
| 8,643,437 B2 | 2/2014 | Chiu |
| 8,649,445 B2 | 2/2014 | Cronie |
| 8,649,460 B2 | 2/2014 | Ware |
| 8,674,861 B2 | 3/2014 | Matsuno |
| 8,687,968 B2 | 4/2014 | Nosaka |
| 8,711,919 B2 | 4/2014 | Kumar |
| 8,718,184 B1 * | 5/2014 | Cronie .................. G06F 13/42 375/295 |
| 8,744,012 B1 | 6/2014 | Ding |
| 8,755,426 B1 | 6/2014 | Cronie |
| 8,773,964 B2 | 7/2014 | Hsueh |
| 8,780,687 B2 | 7/2014 | Clausen |
| 8,782,578 B2 | 7/2014 | Tell |
| 8,791,735 B1 | 7/2014 | Shibasaki |
| 8,831,440 B2 | 9/2014 | Yu |
| 8,841,936 B2 | 9/2014 | Nakamura |
| 8,879,660 B1 | 11/2014 | Peng |
| 8,897,134 B2 | 11/2014 | Kern |
| 8,898,504 B2 | 11/2014 | Baumgartner |
| 8,938,171 B2 | 1/2015 | Tang |
| 8,949,693 B2 | 2/2015 | Ordentlich |
| 8,951,072 B2 | 2/2015 | Hashim |
| 8,975,948 B2 | 3/2015 | GonzalezDiaz |
| 8,989,317 B1 * | 3/2015 | Holden ............... H04L 25/0272 375/295 |
| 9,015,566 B2 | 4/2015 | Cronie |
| 9,020,049 B2 | 4/2015 | Schwager |
| 9,036,764 B1 | 5/2015 | Hossain |
| 9,059,816 B1 * | 6/2015 | Simpson ............... H04L 1/0001 |
| 9,069,995 B1 | 6/2015 | Cronie |
| 9,077,386 B1 * | 7/2015 | Holden ............... H04L 25/4925 |
| 9,083,576 B1 * | 7/2015 | Hormati ............... H04B 17/364 |
| 9,093,791 B2 | 7/2015 | Liang |
| 9,100,232 B1 | 8/2015 | Hormati |
| 9,106,465 B2 | 8/2015 | Walter |
| 9,124,557 B2 | 9/2015 | Fox |
| 9,148,087 B1 | 9/2015 | Tajalli |
| 9,152,495 B2 | 10/2015 | Losh |
| 9,154,252 B2 * | 10/2015 | Cronie ................ H04L 1/0041 |
| 9,165,615 B2 | 10/2015 | Amirkhany |
| 9,172,412 B2 | 10/2015 | Kim |
| 9,178,503 B2 | 11/2015 | Hsieh |
| 9,183,085 B1 | 11/2015 | Northcott |
| 9,197,470 B2 | 11/2015 | Okunev |
| 9,251,873 B1 * | 2/2016 | Fox ..................... G11C 7/1072 |
| 9,281,785 B2 | 3/2016 | Sjoland |
| 9,288,082 B1 | 3/2016 | Ulrich |
| 9,288,089 B2 | 3/2016 | Cronie |
| 9,292,716 B2 | 3/2016 | Winoto |
| 9,300,503 B1 * | 3/2016 | Holden ............... H04L 25/4925 |

(56) References Cited

U.S. PATENT DOCUMENTS

| | | | |
|---|---|---|---|
| 9,306,621 B2 | 4/2016 | Zhang | |
| 9,331,962 B2 | 5/2016 | Lida | |
| 9,362,974 B2 | 6/2016 | Fox | |
| 9,363,114 B2* | 6/2016 | Shokrollahi | H04L 25/03006 |
| 9,374,250 B1 | 6/2016 | Musah | |
| 9,401,828 B2 | 7/2016 | Cronie | |
| 9,432,082 B2 | 8/2016 | Ulrich | |
| 9,432,298 B1 | 8/2016 | Smith | |
| 9,444,654 B2 | 9/2016 | Hormati | |
| 9,455,744 B2 | 9/2016 | George | |
| 9,455,765 B2 | 9/2016 | Schumacher | |
| 9,461,862 B2* | 10/2016 | Holden | H04L 27/2637 |
| 9,479,369 B1 | 10/2016 | Shokrollahi | |
| 9,509,437 B2 | 11/2016 | Shokrollahi | |
| 9,520,883 B2 | 12/2016 | Shibasaki | |
| 9,544,015 B2 | 1/2017 | Ulrich | |
| 9,634,797 B2 | 4/2017 | Benammar | |
| 9,667,379 B2 | 5/2017 | Cronie | |
| 9,686,106 B2* | 6/2017 | Shokrollahi | H04L 25/03006 |
| 9,710,412 B2 | 7/2017 | Sengoku | |
| 9,825,723 B2* | 11/2017 | Holden | H04L 25/4925 |
| 9,838,234 B2* | 12/2017 | Holden | H04L 27/2637 |
| 9,900,186 B2* | 2/2018 | Shokrollahi | H04L 25/0272 |
| 9,917,711 B2 | 3/2018 | Ulrich | |
| 9,929,818 B2* | 3/2018 | Holden | H04L 25/4925 |
| 10,020,966 B2* | 7/2018 | Shokrollahi | H04L 25/03006 |
| 10,044,452 B2* | 8/2018 | Holden | H04L 25/4925 |
| 2001/0006538 A1 | 7/2001 | Simon | |
| 2001/0055344 A1 | 12/2001 | Lee | |
| 2002/0034191 A1 | 3/2002 | Shattil | |
| 2002/0044316 A1 | 4/2002 | Myers | |
| 2002/0057592 A1 | 5/2002 | Robb | |
| 2002/0149508 A1* | 10/2002 | Hamashita | H03M 3/496 341/172 |
| 2002/0154633 A1 | 10/2002 | Shin | |
| 2002/0163881 A1 | 11/2002 | Dhong | |
| 2002/0167339 A1 | 11/2002 | Chang | |
| 2002/0174373 A1 | 11/2002 | Chang | |
| 2002/0181607 A1 | 12/2002 | Izumi | |
| 2003/0016763 A1 | 1/2003 | Doi | |
| 2003/0016770 A1 | 1/2003 | Trans | |
| 2003/0046618 A1 | 3/2003 | Collins | |
| 2003/0085763 A1 | 5/2003 | Schrodinger | |
| 2003/0146783 A1 | 8/2003 | Bandy | |
| 2003/0174023 A1 | 9/2003 | Miyasita | |
| 2003/0185310 A1 | 10/2003 | Ketchum | |
| 2003/0218558 A1 | 11/2003 | Mulder | |
| 2004/0027185 A1 | 2/2004 | Fiedler | |
| 2004/0146117 A1 | 7/2004 | Subramaniam | |
| 2004/0155802 A1 | 8/2004 | Lamy | |
| 2004/0161019 A1 | 8/2004 | Raghavan | |
| 2004/0169529 A1 | 9/2004 | Afghahi | |
| 2004/0170231 A1 | 9/2004 | Bessios | |
| 2005/0057379 A1 | 3/2005 | Jansson | |
| 2005/0063493 A1 | 3/2005 | Foster | |
| 2005/0134380 A1 | 6/2005 | Nairn | |
| 2005/0149833 A1 | 7/2005 | Worley | |
| 2005/0174841 A1 | 8/2005 | Ho | |
| 2005/0195000 A1 | 9/2005 | Parker | |
| 2005/0201491 A1 | 9/2005 | Wei | |
| 2005/0213686 A1 | 9/2005 | Love | |
| 2005/0220182 A1 | 10/2005 | Kuwata | |
| 2005/0270098 A1 | 12/2005 | Zhang | |
| 2006/0036668 A1 | 2/2006 | Jaussi | |
| 2006/0097786 A1 | 5/2006 | Su | |
| 2006/0103463 A1 | 5/2006 | Lee | |
| 2006/0120486 A1 | 6/2006 | Visalli | |
| 2006/0126751 A1 | 6/2006 | Bessios | |
| 2006/0133538 A1 | 6/2006 | Stojanovic | |
| 2006/0140324 A1 | 6/2006 | Casper | |
| 2006/0159005 A1 | 7/2006 | Rawlins | |
| 2006/0232461 A1 | 10/2006 | Felder | |
| 2006/0233291 A1 | 10/2006 | Garlepp | |
| 2006/0291589 A1 | 12/2006 | Eliezer | |
| 2007/0001723 A1 | 1/2007 | Lin | |
| 2007/0002954 A1 | 1/2007 | Cornelius | |
| 2007/0030796 A1 | 2/2007 | Green | |
| 2007/0076871 A1 | 4/2007 | Renes | |
| 2007/0103338 A1 | 5/2007 | Teo | |
| 2007/0121716 A1 | 5/2007 | Nagarajan | |
| 2007/0182487 A1 | 8/2007 | Ozasa | |
| 2007/0188367 A1 | 8/2007 | Yamada | |
| 2007/0201546 A1 | 8/2007 | Lee | |
| 2007/0201597 A1 | 8/2007 | He | |
| 2007/0204205 A1 | 8/2007 | Niu | |
| 2007/0263711 A1 | 11/2007 | Kramer | |
| 2007/0283210 A1 | 12/2007 | Prasad | |
| 2008/0007367 A1 | 1/2008 | Kim | |
| 2008/0012598 A1 | 1/2008 | Mayer | |
| 2008/0104374 A1 | 5/2008 | Mohamed | |
| 2008/0159448 A1 | 7/2008 | Anim-Appiah | |
| 2008/0192621 A1 | 8/2008 | Suehiro | |
| 2008/0317188 A1 | 12/2008 | Staszewski | |
| 2009/0059782 A1 | 3/2009 | Cole | |
| 2009/0115523 A1 | 5/2009 | Akizuki | |
| 2009/0154604 A1 | 6/2009 | Lee | |
| 2009/0193159 A1 | 7/2009 | Li | |
| 2009/0195281 A1 | 8/2009 | Tamura | |
| 2009/0262876 A1 | 10/2009 | Arima | |
| 2009/0316730 A1 | 12/2009 | Feng | |
| 2009/0323864 A1 | 12/2009 | Tired | |
| 2010/0046644 A1 | 2/2010 | Mazet | |
| 2010/0081451 A1 | 4/2010 | Mueck | |
| 2010/0148819 A1 | 6/2010 | Bae | |
| 2010/0180143 A1 | 7/2010 | Ware | |
| 2010/0215087 A1 | 8/2010 | Tsai | |
| 2010/0215112 A1 | 8/2010 | Tsai | |
| 2010/0235673 A1 | 9/2010 | Abbasfar | |
| 2010/0271107 A1 | 10/2010 | Tran | |
| 2010/0283894 A1 | 11/2010 | Horan | |
| 2010/0296556 A1 | 11/2010 | Rave | |
| 2010/0309964 A1 | 12/2010 | Oh | |
| 2010/0329325 A1 | 12/2010 | Mobin | |
| 2011/0014865 A1 | 1/2011 | Seo | |
| 2011/0028089 A1 | 2/2011 | Komori | |
| 2011/0032977 A1 | 2/2011 | Hsiao | |
| 2011/0051854 A1 | 3/2011 | Kizer | |
| 2011/0072330 A1 | 3/2011 | Kolze | |
| 2011/0074488 A1 | 3/2011 | Broyde | |
| 2011/0084737 A1 | 4/2011 | Oh | |
| 2011/0103508 A1 | 5/2011 | Mu | |
| 2011/0127990 A1 | 6/2011 | Wilson | |
| 2011/0228864 A1 | 9/2011 | Aryanfar | |
| 2011/0235501 A1 | 9/2011 | Goulahsen | |
| 2011/0268225 A1 | 11/2011 | Cronie | |
| 2011/0286497 A1* | 11/2011 | Nervig | H04L 5/0021 375/147 |
| 2011/0299555 A1 | 12/2011 | Cronie | |
| 2011/0302478 A1 | 12/2011 | Cronie | |
| 2011/0317559 A1 | 12/2011 | Kern | |
| 2012/0082203 A1 | 4/2012 | Zerbe | |
| 2012/0133438 A1 | 5/2012 | Tsuchi | |
| 2012/0152901 A1 | 6/2012 | Nagorny | |
| 2012/0161945 A1 | 6/2012 | Single | |
| 2012/0213299 A1 | 8/2012 | Cronie | |
| 2012/0257683 A1 | 10/2012 | Schwager | |
| 2013/0010892 A1 | 1/2013 | Cronie | |
| 2013/0013870 A1 | 1/2013 | Cronie | |
| 2013/0088274 A1 | 4/2013 | Gu | |
| 2013/0106513 A1 | 5/2013 | Cyrusian | |
| 2013/0114392 A1 | 5/2013 | Sun et al. | |
| 2013/0114519 A1 | 5/2013 | Gaal | |
| 2013/0114663 A1 | 5/2013 | Ding | |
| 2013/0129019 A1 | 5/2013 | Sorrells | |
| 2013/0147553 A1 | 6/2013 | Iwamoto | |
| 2013/0159584 A1* | 6/2013 | Nygren | G06F 13/4273 710/305 |
| 2013/0188656 A1 | 7/2013 | Ferraiolo | |
| 2013/0195155 A1 | 8/2013 | Pan | |
| 2013/0202065 A1 | 8/2013 | Chmelar | |
| 2013/0215954 A1 | 8/2013 | Beukema | |
| 2013/0259113 A1 | 10/2013 | Kumar | |
| 2013/0271194 A1 | 10/2013 | Pellerano | |
| 2013/0307614 A1 | 11/2013 | Dai | |

(56) References Cited

U.S. PATENT DOCUMENTS

| | | | |
|---|---|---|---|
| 2013/0314142 A1 | 11/2013 | Tamura | |
| 2013/0315501 A1 | 11/2013 | Atanassov | |
| 2013/0346830 A1 | 12/2013 | Ordentlich | |
| 2014/0159769 A1 | 6/2014 | Hong | |
| 2014/0177645 A1 | 6/2014 | Cronie | |
| 2014/0177696 A1 | 6/2014 | Hwang | |
| 2014/0226734 A1* | 8/2014 | Fox | H03K 19/017509 375/259 |
| 2014/0254642 A1* | 9/2014 | Fox | H04L 25/028 375/219 |
| 2014/0266440 A1 | 9/2014 | Itagaki | |
| 2014/0269130 A1 | 9/2014 | Maeng | |
| 2014/0286381 A1 | 9/2014 | Shibasaki | |
| 2015/0049798 A1 | 2/2015 | Hossein | |
| 2015/0063494 A1* | 3/2015 | Simpson | H04B 1/06 375/318 |
| 2015/0070201 A1 | 3/2015 | Dedic | |
| 2015/0078479 A1 | 3/2015 | Whitby-Strevens | |
| 2015/0092532 A1* | 4/2015 | Shokrollahi | H04L 1/0056 370/216 |
| 2015/0117579 A1 | 4/2015 | Shibasaki | |
| 2015/0146771 A1 | 5/2015 | Walter | |
| 2015/0222458 A1 | 8/2015 | Hormati | |
| 2015/0236885 A1* | 8/2015 | Ling | H04L 27/266 375/340 |
| 2015/0249559 A1* | 9/2015 | Shokrollahi | H04L 25/03006 375/257 |
| 2015/0256326 A1* | 9/2015 | Simpson | H04L 7/0025 375/355 |
| 2015/0333940 A1* | 11/2015 | Shokrollahi | H04L 25/0272 375/296 |
| 2015/0349835 A1 | 12/2015 | Fox | |
| 2015/0380087 A1 | 12/2015 | Mittelholzer | |
| 2015/0381232 A1* | 12/2015 | Ulrich | H04B 3/04 375/230 |
| 2015/0381346 A1* | 12/2015 | Holden | H04L 25/4925 714/775 |
| 2016/0013954 A1* | 1/2016 | Shokrollahi | H04L 25/0272 375/257 |
| 2016/0020796 A1 | 1/2016 | Hormati | |
| 2016/0020824 A1 | 1/2016 | Ulrich | |
| 2016/0036616 A1* | 2/2016 | Holden | H04L 27/2637 375/260 |
| 2016/0197747 A1* | 7/2016 | Ulrich | H04L 25/02 375/257 |
| 2016/0211929 A1* | 7/2016 | Holden | H04L 25/4925 |
| 2016/0261435 A1 | 9/2016 | Musah | |
| 2016/0294586 A1* | 10/2016 | Shokrollahi | H04L 25/03006 |
| 2016/0380787 A1* | 12/2016 | Hormati | H04L 25/03885 375/233 |
| 2017/0026217 A1* | 1/2017 | Holden | H04L 27/2637 |
| 2017/0111192 A1* | 4/2017 | Shokrollahi | H04L 25/03006 |
| 2017/0272285 A1* | 9/2017 | Shokrollahi | H04L 25/0276 |
| 2017/0279642 A1* | 9/2017 | Fox | H04L 5/02 |
| 2017/0310456 A1 | 10/2017 | Tajalli | |
| 2017/0317449 A1 | 11/2017 | Shokrollahi | |
| 2017/0317855 A1* | 11/2017 | Shokrollahi | H04L 25/03343 |
| 2018/0076912 A1* | 3/2018 | Holden | H04L 25/4925 |
| 2018/0091351 A1* | 3/2018 | Holden | H04L 27/2637 |
| 2018/0176045 A1* | 6/2018 | Shokrollahi | H04L 25/0272 |
| 2018/0183497 A1* | 6/2018 | Cronie | H04L 25/0272 |

FOREIGN PATENT DOCUMENTS

| | | | |
|---|---|---|---|
| CN | 101478286 | | 7/2009 |
| CN | 101820288 | | 9/2010 |
| CN | 101854223 | | 10/2010 |
| CN | 102368929 A * | 3/2012 | A47C 7/14 |
| CN | 106073268 A * | 11/2016 | A47C 7/14 |
| EP | 1926267 | | 5/2008 |
| EP | 2413744 A1 * | 2/2012 | A47C 7/14 |
| EP | 2039221 | | 2/2013 |
| EP | 2413744 B1 * | 10/2014 | A47C 7/14 |
| JP | 2003163612 | | 6/2003 |
| WO | 2005002162 | | 1/2005 |
| WO | 2009084121 | | 7/2009 |
| WO | 2010031824 | | 3/2010 |
| WO | WO-2010104636 A1 * | 9/2010 | A47C 7/14 |
| WO | 2011119359 | | 9/2011 |

OTHER PUBLICATIONS

Abbasfar, A., "Generalized Differential Vector Signaling", IEEE International Conference on Comminications, ICC '09, (Jun. 14, 2009), pp. 1-5.

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Burr, "Spherical Codes for M-ARY Code Shift Keying", University of York, Apr. 2, 1989, pp. 67-72, United Kingdom.

Cheng, W., "Memory Bus Encoding for Low Power: A Tutorial", Quality Electronic Design, IEEE, International Symposium on Mar. 26-28, 2001, pp. 199-204, Piscataway, NJ.

Clayton, P., "Introduction to Electromagnetic Compatibility", Wiley-Interscience, 2006.

Counts, L., et al., "One-Chip Slide Rule Works with Logs, Antilogs for Real-Time Processing," Analog Devices Computational Products 6, Reprinted from Electronic Design, May 2, 1985, 7 pages.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Design Brief 208 Using the Anadigm Multiplier CAM, Copyright 2002 Anadigm, 6 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Grahame, J., "Vintage Analog Computer Kits," posted on Aug. 25, 2006 in Classic Computing, 2 pages, http.//www.retrothing.com/2006/08/classic_analog_.html.

Healey, A., et al., "A Comparison of 25 Gbps NRZ & PAM-4 Modulation used in Legacy & Premium Backplane Channels", DesignCon 2012, 16 pages.

International Search Report and Written Opinion for PCT/EP2011/059279 dated Sep. 22, 2011.

International Search Report and Written Opinion for PCT/EP2011/074219 dated Jul. 4, 2012.

International Search Report and Written Opinion for PCT/EP2012/052767 dated May 11, 2012.

International Search Report and Written Opinion for PCT/US14/052986 dated Nov. 24, 2014.

International Search Report and Written Opinion from PCT/US2014/034220 dated Aug. 21, 2014.

International Search Report and Written Opinion of the International Searching Authority, dated Jul. 14, 2011 in International Patent Application S.N. PCT/EP2011/002170, 10 pages.

International Search Report and Written Opinion of the International Searching Authority, dated Nov. 5, 2012, in International Patent Application S.N. PCT/EP2012/052767, 7 pages.

International Search Report for PCT/US2014/053563, dated Nov. 11, 2014, 2 pages.

Jiang, A., et al., "Rank Modulation for Flash Memories", IEEE Transactions of Information Theory, Jun. 2006, vol. 55, No. 6, pp. 2659-2673.

Loh, M., et al., "A 3x9 Gb/s Shared, All-Digital CDR for High-Speed, High-Density I/O", Matthew Loh, IEEE Journal of Solid-State Circuits, Vo. 47, No. 3, Mar. 2012.

Notification of Transmittal of International Search Report and the Written Opinion of the International Searching Authority, for PCT/US2015/018363, dated Jun. 18, 2015, 13 pages.

(56) References Cited

OTHER PUBLICATIONS

Notification of Transmittal of the International Search Report and the Written Opinion of the International Searching Authority, or the Declaration for PCT/EP2013/002681, dated Feb. 25, 2014, 15 pages.
Notification of Transmittal of the International Search Report and the Written Opinion of the International Searching Authority, or the Declaration, dated Mar. 3, 2015, for PCT/US2014/066893, 9 pages.
Notification of Transmittal of the International Search Report and the Written Opinion of the International Searching Authority, or the Declaration, for PCT/US2014/015840, dated May 20, 2014. 11 pages.
Notification of Transmittal of the International Search Report and the Written Opinion of the International Searching Authority, or the Declaration, for PCT/US2014/043965, dated Oct. 22, 2014, 10 pages.
Notification of Transmittal of the International Search Report and the Written Opinion of the International Searching Authority, or the Declaration, for PCT/US2015/037466, dated Nov. 19, 2015.
Notification of Transmittal of the International Search Report and the Written Opinion of the International Searching Authority, or the Declaration, for PCT/US2015/039952, dated Sep. 23, 2015, 8 pages.
Notification of Transmittal of the International Search Report and the Written Opinion of the International Searching Authority, or the Declaration, for PCT/US2015/041161, dated Oct. 7, 2015, 8 pages.
Notification of Transmittal of the International Search Report and the Written Opinion of the International Searching Authority, or the Declaration, for PCT/US2015/043463, dated Oct. 16, 2015, 8 pages.
Oh, et al., Pseudo-Differential Vector Signaling for Noise Reduction in Single-Ended Signaling, DesignCon 2009.
Poulton, et al., "Multiwire Differential Signaling", UNC-CH Department of Computer Science Version 1.1, Aug. 6, 2003.
Schneider, J., et al., "ELEC301 Project: Building an Analog Computer," Dec. 19, 1999, 8 pages, http://www.clear.rice.edu/elec301/Projects99/anlgcomp/.
She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.
Skliar et al., A Method for the Analysis of Signals: the Square-Wave Method, Mar. 2008, Revista de Matematica: Teoria y Aplicationes, pp. 109-129.
Slepian, D., "Premutation Modulation", IEEE, vol. 52, No. 3, Mar. 1965, pp. 228-236.
Stan, M., et al., "Bus-Invert Coding for Low-Power I/O, IEEE Transactions on Very Large Scale Integration (VLSI) Systems", vol. 3, No. 1, Mar. 1995, pp. 49-58.
Tallini, L., et al., "Transmission Time Analysis for the Parallel Asynchronous Communication Scheme", IEEE Transactions on Computers, vol. 52, No. 5, May 2003, pp. 558-571.
Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.
Wang et al., "Applying CDMA Technique to Network-on-Chip", IEEE Transactions on Very Large Scale Integration (VLSI) Systems, vol. 15, No. 10 (Oct. 1, 2007), pp. 1091-1100.
Zouhair Ben-Neticha et al, "The streTched-Golay and other codes for high-SNR fnite-delay quantization of the Gaussian source at ½ Bit per sample", IEEE Transactions on Communications, vol. 38, No. 12 Dec. 1, 1990, pp. 2089-2093, XP000203339, ISSN: 0090-6678, DOI: 10.1109/26.64647.
Notification of Transmittal of the International Search Report and the Written Opinion of the International Searching Authority, or the Declaration, dated Feb. 15, 2017, 10 pages.
Notification of Transmittal of the International Search Report and the Written Opinion of the International Searching Authority, or the Declaration., for PCT/US17/14997, dated Apr. 7, 2017.
Holden, B., "Simulation results for NRZ, ENRZ & PAM-4 on 16-wire full-sized 400GE backplanes", IEEE 802.3 400GE Study Group, Sep. 2, 2013, 19 pages, www.ieee802.0rg/3/400GSG/publiv/13_09/holden_400_01_0913.pdf.
Holden, B., "An exploration of the technical feasibility of the major technology options for 400GE backplanes", IEEE 802.3 400GE Study Group, Jul. 16, 2013, 18 pages, http://ieee802.org/3/400GSG/public/13_07/holden_400_01_0713.pdf.
Holden, B., "Using Ensemble NRZ Coding for 400GE Electrical Interfaces", IEEE 802.3 400GE Study Group, May 17, 2013, 24 pages, http://www.ieee802.org/3/400GSG/public/13_05/holden_400_01_0513.pdf.
Reza Navid et al, "A 40 Gb/s Serial Link Transceiver in 28 nm CMOS Technology", IEEE Journal of Solid-State Circuits, vol. 50, No. 4. Apr. 2015, pp. 814-827.
Linten, D. et al., "T-Diodes—A Novel Plus-and-Play Wideband RF Circuit ESD Protection Methodology" EOS/ESD Symposium 07, pp. 242-249.
Hyosup Won et al, "A 28-Gb/s Receiver With Self-contained Adaptive Equalization and Sampling Point Control Using Stochastic Sigma-Tracking Eye-Opening Monitor", IEEE Transactions on Circuits and Systems—I: Regular Papers, vol. 64, No. 3, Mar. 2017. pp. 664-674.
Giovaneli, et al., "Space-frequency coded OFDM system for multi-wire power line communications", Power Line Communications and Its Applications, 20015 International Symposium on Vancouver, BC, Canada, Apr. 6-8, 2005, Piscataway, NJ, pp. 191-195.
Farzan, et al., "Coding Schemes for Chip-to-Chip Interconnect Applications", IEEE Transactions on Very Large Scale Integration (VLSI) Systems, vol. 14, pp. 393-406, Apr. 2006.
Anonymous, "Constant-weight code", Wikipedia.org, retrieved on Jun. 2, 2017.
Shibasaki, et al., "A 56-Gb/s Receiver Front-End with a CTLE and 1-Tap DFE in 20-nm CMOS", IEEE 2014 Symposium on VLSI Circuits Digest of Technical Papers, 2 pgs.
Hidaka, et al., "A 4-Channel 1.25-10.3 Gb/s Backplane Transceiver Macro With35 dB Equalizer and Sign-Based Zero-Forcing Adaptive Control", IEEE Journal of Solid-State Circuits, vol. 44 No. 12, Dec. 2009, pp. 3547-3559.

\* cited by examiner

Mix [ 1/3 1/3 1/3  -1/3 -1/3 -1/3 ]

CML with EQ

CML no EQ

Mix [ 1/3 1/3 1/3  -1/3 -1/3 -1/3 ]

CML with EQ

CML no EQ

Mix [ 1/2 1/2 -1 0 0 0 ]

Mix [ 1/2 1/2 -1 0 0 0 ]

Mix [ 1 -1 0 0 0 0 ]

CML with EQ

CML no EQ

VECTOR SIGNALING CODES WITH INCREASED SIGNAL TO NOISE CHARACTERISTICS

This application is a continuation of U.S. application Ser. No. 14/796,443, filed Jul. 10, 2015, naming Amin Shokrollahi and Roger Ulrich, entitled "Vector Signaling Codes with Increased Signal to Noise Characteristics," which claims priority to U.S. Provisional Patent Application No. 62/023,163, filed Jul. 10, 2014, naming Amin Shokrollahi, entitled "Vector Signaling Codes with Increased Signal to Noise Characteristics" all of which are hereby incorporated by reference herein in their entirety for all purposes.

REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication No. 2011/0302478 of U.S. patent application Ser. No. 13/154,009, filed Jun. 6, 2011, naming Harm Cronie and Amin Shokrollahi, entitled "Error Control Coding for Orthogonal Differential Vector Signaling" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III");

U.S. Patent Publication No. 2011/0299555 of U.S. patent application Ser. No. 13/154,009, filed Jun. 6, 2011, naming Harm Cronie and Amin Shokrollahi, entitled "Error Control Coding for Orthogonal Differential Vector Signaling" (hereinafter "Cronie IV");

U.S. Provisional Patent Application No. 61/763,403, filed Feb. 11, 2013, naming John Fox, Brian Holden, Ali Hormati, Peter Hunt, John D Keay, Amin Shokrollahi, Anant Singh, Andrew Kevin John Stewart, Giuseppe Surace, and Roger Ulrich, entitled "Methods and Systems for High Bandwidth Chip-to-Chip Communications Interface" (hereinafter called "Fox I");

U.S. Provisional Patent Application No. 61/773,709, filed Mar. 6, 2013, naming John Fox, Brian Holden, Peter Hunt, John D Keay, Amin Shokrollahi, Andrew Kevin John Stewart, Giuseppe Surace, and Roger Ulrich, entitled "Methods and Systems for High Bandwidth Chip-to-Chip Communications Interface" (hereinafter called "Fox II");

U.S. Provisional Patent Application No. 61/812,667, filed Apr. 16, 2013, naming John Fox, Brian Holden, Ali Hormati, Peter Hunt, John D Keay, Amin Shokrollahi, Anant Singh, Andrew Kevin John Stewart, and Giuseppe Surace, entitled "Methods and Systems for High Bandwidth Communications Interface" (hereinafter called "Fox III");

U.S. patent application Ser. No. 13/842,740, filed Mar. 15, 2013, naming Brian Holden, Amin Shokrollahi, and Anant Singh, entitled "Methods and Systems for Skew Tolerance and Advanced Detectors for Vector Signaling Codes for Chip-to-Chip Communication" (hereinafter called "Holden I");

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences" (hereinafter called "Ulrich I").

U.S. patent application Ser. No. 14/315,306, filed Jun. 25, 2014, naming Roger Ulrich, entitled "Multilevel Driver for High Speed Chip-to-Chip Communications" (hereinafter called "Ulrich II").

U.S. Provisional Patent Application No. 61/934,804, filed Feb. 2, 2014, naming Ali Hormati and Amin Shokrollahi, entitled "Method for Code Evaluation using ISI Ratio" (hereinafter called "Hormati I").

U.S. Provisional Patent Application No. 61/992,711, filed May 13, 2014, naming Amin Shokrollahi, entitled "Vector Signaling Code with Improved Noise Margin" (hereinafter called "Shokrollahi I").

TECHNICAL FIELD

Embodiments discussed herein relate to communications in general and in particular to the transmission of signals capable of conveying information and detection of those signals in chip-to-chip communication.

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, or multiple such circuits relative to ground or other common reference. A common example uses singled-ended signaling ("SES"). SES operates by sending a signal on one wire, and measuring the signal relative to a fixed reference at the receiver. A serial communication link may also be based on multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

With binary vector signaling, each component or "symbol" of the vector takes on one of two possible values. With non-binary vector signaling, each symbol has a value that is a selection from a set of more than two possible values. The set of values that a symbol of the vector may take on is called the "alphabet" of the vector signaling code. A vector signaling code, as described herein, is a collection C of vectors of the same length N, called codewords. Any suitable subset of a vector signaling code denotes a "subcode" of that code. Such a subcode may itself be a vector signaling code.

In operation, the coordinates of the codewords are bounded, and we choose to represent them by real numbers between −1 and 1. The ratio between the binary logarithm of the size of C and the length N is called the pin-efficiency of the vector signaling code.

A vector signaling code is called "balanced" if for all its codewords the sum of the coordinates is always zero. Balanced vector signaling codes have several important properties. For example, as is well-known to those of skill in the art, balanced codewords lead to lower electromagnetic interference (EMI) noise than non-balanced ones. Also, if common mode resistant communication is required, it is advisable to use balanced codewords, since otherwise power is spent on generating a common mode component that is cancelled at the receiver.

Additional examples of vector signaling methods are described in Cronie I, Cronie II, Cronie III, Cronie IV, Fox I, Fox II, Fox III, Holden I, Shokrollahi I, and Hormati I.

BRIEF DESCRIPTION

Vector signaling codes may be synergistically combined with multi-level signaling, the increased alphabet size provided by the multi-level signaling enabling a larger codeword space for a given number of symbols, which in turn permits introduction of additional constraints on construction of the vector signaling code to provide robust transmission results with acceptable throughput. However, introduction of additional signal levels within a fixed transmission amplitude envelope is known to reduce the available signal detection margin for each received signal level, potentially leading to degraded reception.

Vector signaling code construction methods have been disclosed in which code construction is coordinated with design of an associated receive comparator network, such that the system performance of the combination is optimized. Such methods may be extended to incorporate modified multi-level signaling values which provide consistent signal detection margin across the set of receive comparators.

DETAILED DESCRIPTION

Figure 16:
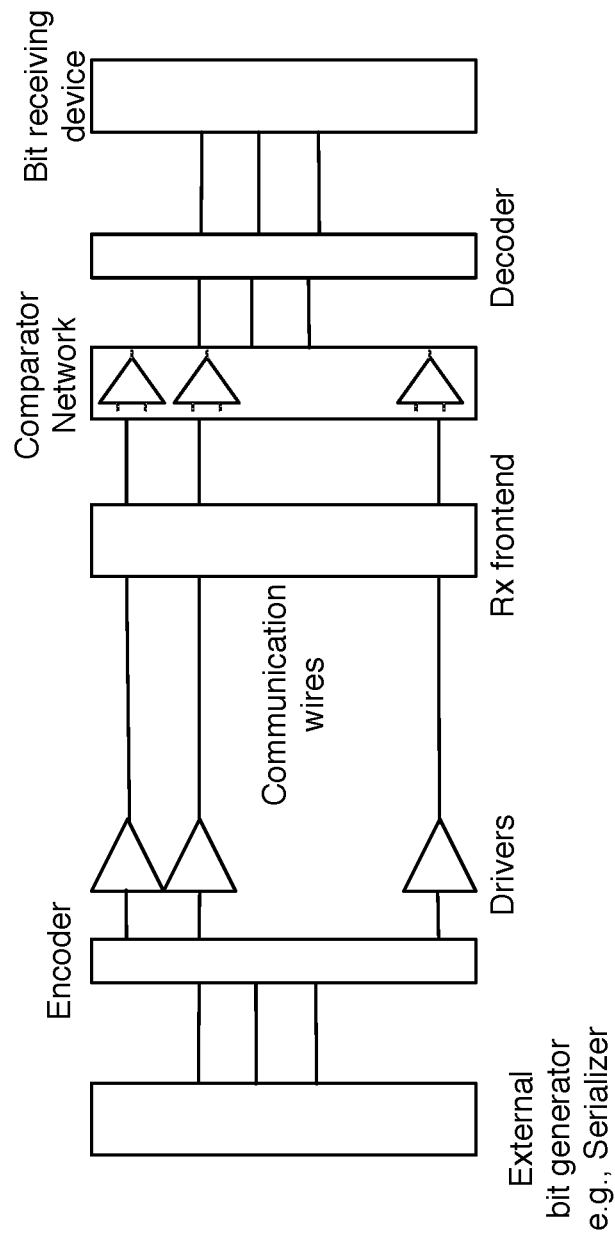
FIG. 16 is an exemplary embodiment of a communication system.

FIG. 16 is an exemplary embodiment of a communication system as used in this patent application. It comprises an Encoder unit, Drivers, communication wires, a Receiver front-end which may include equalization such as CTLE, a comparator network consisting of one or more comparators wherein each comparator compares a linear combination of values of some of the wires against a fixed reference or against another linear combination of the wire values; additionally, the communication system may comprise a Decoder unit. The bits b0, b1, . . . are fed to the Encoder through another unit, which may be a Serializer in some applications. The output of the Decoder unit are the bits b0, b1, . . . and these bits are forwarded to another hardware unit, which in applications can be as varied as an optical transceiver, a DRAM, a controller, or a processor, to name a few examples. The task of the communication system is to reliably transmit the bits b0, b1, . . . through the communication chain as described here. Typically, the encoder and the decoder units are implemented in digital logic, whereas the other elements of the chain may be implemented in analog circuitry, though this is not crucial for the teachings of this application. Moreover, in some embodiments, the Encoder and/or the Decoder units may not be present, or have their functions subsumed into other elements. As one example, one embodiment incorporates an encoder with a transmit data to codeword mapping chosen such that the corresponding receiver's comparator network produces outputs which directly map to received data bits b0, b1, . . . .

The concept of orthogonal vector signaling is described in [Croniel]. As presented there, an orthogonal differential vector signaling code (or ODVS code) may be obtained via the multiplication $$(0, x_2, \ldots, x_n) * M/a \qquad \text{[Eqn. 1]}$$

wherein M is an orthogonal n×n-matrix in which the sum of the columns is zero except at the first position, $x_2, \ldots, x_n$ belong to an alphabet S describing the original modulation of these symbols, and a is a normalization constant which ensures that all the coordinates of the resulting vector are between −1 and +1. For example, in case of binary modulation, the alphabet S may be chosen to be {−1,+1}. In case of ternary modulation, the alphabet S may be chosen as {−1,0,1}, in case of quaternary modulation, the alphabet S may be chosen as {−3,−1,1,3}, and in case of quintary modulation S may be chosen as {−2,−1,0,1,2}. In general, however, it is not necessary that all the $x_i$ are modulated by the same alphabet S. The vector $(x_2, \ldots, x_n)$ is often denoted by x henceforth and is called the message.

In at least one embodiment, the multiplication of Eqn. 1 represents a weighted sum of sub-channel code vectors, each sub-channel code vector weighted based on a corresponding antipodal weight of a set of antipodal weights, wherein the sub-channel code vectors are mutually orthogonal, and wherein the sub-channel code vectors represent rows of a scaled-orthogonal matrix, M.

In operation, the matrix M does not need to be orthogonal. It suffices that all its rows (also referred to herein as sub-channel code vectors) are pairwise orthogonal (even if the rows are not of Euclidean norm 1). In the following, we call such matrices s-orthogonal (scaled orthogonal).

Detection of the transmitted signals can be accomplished with the matrix M in the following manner. Each row of M is scaled in such a way as to ensure that the sum of the positive entries in that row is equal to 1. Then the entries of each row of this new matrix D (except for the first) are used as coefficients of a multi-input comparator as defined in [Holden I]. For example, if n=6, the values on the 6 wires (possibly after equalization) are denoted by a, b, c, d, e, f and the row is [1, ½, −1, ½, −1, 0], then the multi-input comparator would calculate the value $$\frac{a}{2} + \frac{b+d}{4} - \left(\frac{c+e}{2}\right) \quad \text{[Eqn. 2]}$$

and would slice the result to reconstruct the original value in the alphabet S. The set of multi-input comparators defined by matrix D are said to detect the ODVS code defined by M if the collection of comparator outputs unambiguously identifies any message x encoded by M as described above.

Multi-Input Comparators

Following the definition of [Holden I], a multi-input comparator with coefficients $a_0, a_1, \ldots, a_{m-1}$ is a circuit that accepts as its input a vector $(x_0, x_1, \ldots, x_{m-1})$ and outputs $$\text{sign}(a_0 * x_0 + \ldots + a_{m-1} * x_{m-1}), \quad \text{[Eqn. 3]}$$

with the definition of the sign-function being sign(x)=+1 if x>0, sign(x)=−1 if x<0, and sign(x) is undefined if x=0. As such, a simple comparator may be seen to be a two input multi-input comparator with coefficients 1 and −1, hence may be considered to be a special case of a multi-input comparator.

Figure 1:
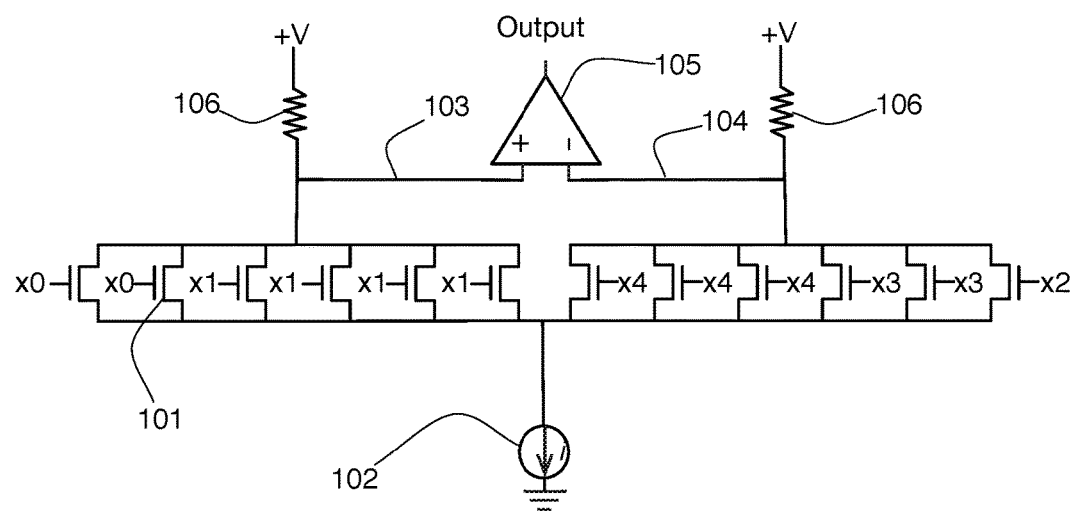
FIG. 1 shows one embodiment of a multi-input comparator producing a result from the weighted sum of multiple input values.

The weighting coefficients $a_0, a_1, \ldots, a_{m-1}$ of a multi-input comparator are rational numbers, and one example implementation is shown as FIG. 1, where input weights of 2, 4, −1, −2, −3 are associated with the input values x0 through x4 respectively, each input weight in this example providing a fractional proportion of the total number of transistors (and thus, a comparable proportion of the output result) on that differential input leg, in this case six on each side. In this example, each of the twelve input transistors 101 are identical, representing an extended differential input stage sharing current source 102, followed by differential comparator stage 105. As all transistors 101 are identical, the contributions of inputs x0 and x1 to positive summing node 103, and of inputs x2, x3, and x4 to negative summing node 104 are weighted in proportion to the number of input transistors controlled by each such input, relative to the total number of transistors 101 associated with node 103 and node 104 respectively. Resistors 106 are shown as passive pull-ups on summing nodes 103 and 104; in some embodiments their function will be incorporated in that of differential comparator 105. Assuming sufficiently high gain in differential comparator 105 to obtain a digital result, its output represents the sign( ) operation taken on the difference between positive summing node 103 and negative summing node 104.

Thus, the circuit of FIG. 1 implements Eqn. 3, where inputs with positive coefficients are attached to transistors 101 associated with positive summing node 103, and inputs with negative coefficients are attached to transistors 101 associated with negative summing node 104, the coefficient values being represented by the ratio of the number of identical input transistors 101 used for each input to the total number of identical input transistors 101 associated with that input node 103 or 104.

As present embodiments primarily addresses higher order modulation, the descriptive convention herein will be to assume that each example of a multi-level comparator comprises multiple appropriately-weighted inputs and summation and difference computations, the comparator output value which (also referenced to herein as the combined input value) is presented as a linear signal to a binary or higher-order slicer or digital comparator (herein, simply called the comparator) detecting the desired multi-valued signal result.

Although scaling, summation, difference, and comparator elements of multi-input comparators may be described discretely for purposes of explanation, practical embodiments may utilize circuit functions combining aspects of multiple such elements, as further described in [Holden I] and [Ulrich I].

Eye Opening

Figure 2:
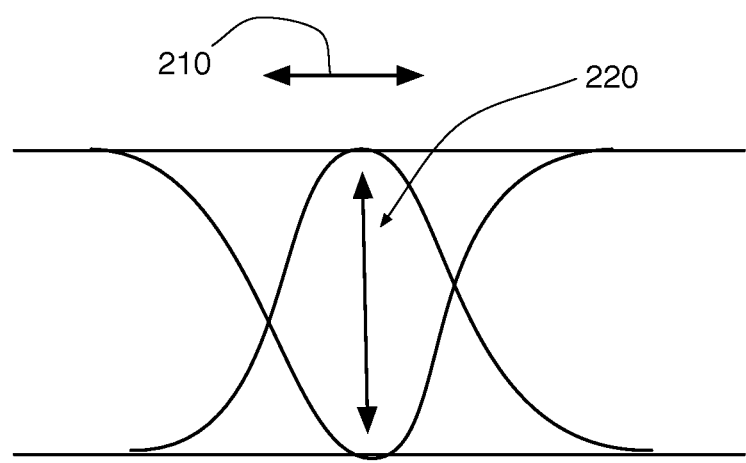
FIG. 2 illustrates receive eye openings for binary and ternary signals.
Figure 2:
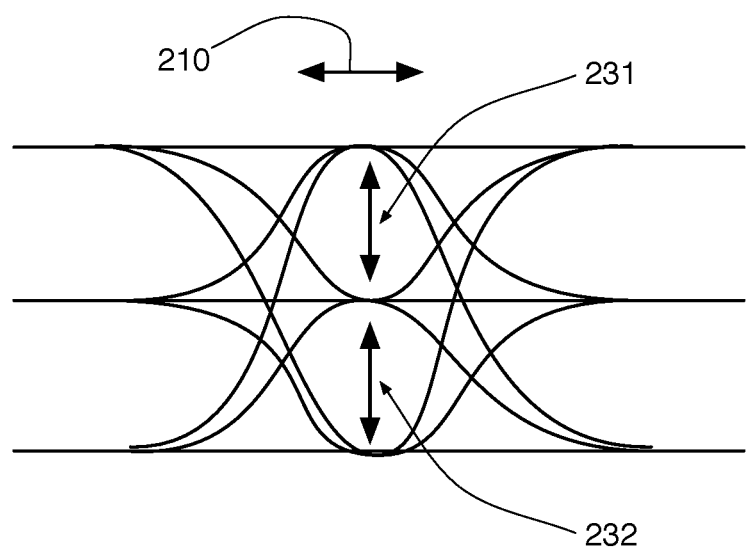
Figure 3:
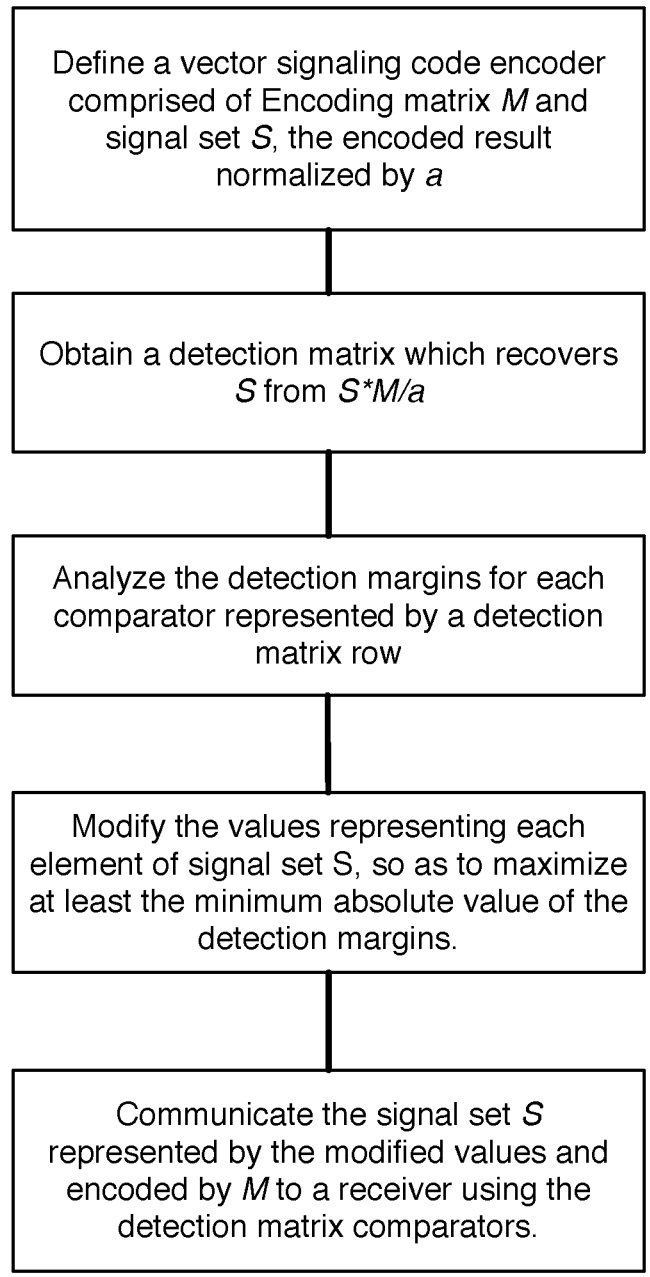
FIG. 3 is a block diagram in accordance with one embodiment.

Conventionally, the receiver detection window for receiver slicing operations is described as the "eye opening" of graphs such as illustrated in FIG. 2, showing a time-superimposed representation of all possible received signal patterns (and thus, every possible inter-symbol interference or ISI condition) at the comparator or slicer input. For binary modulation, horizontal "eye" opening 210 represents the available time interval during which a stable result may be sampled, and vertical eye opening 220 represents the detectable signal over noise available to the slicer. For ternary modulated signals, there are two eye openings 231 and 232, corresponding to the signal margins for detection of the three possible signal levels. These smaller vertical openings 231 and 232 versus 220 correspond to higher susceptibility of the signal to communications channel and internal receiver noise with ternary versus binary modulation. Generalizing, the larger the size n, the larger the value of the normalization constant a in Eqn. 1 must be, leading to smaller incremental differences between output levels, and therefore to a smaller measurement window (that is, a smaller vertical "eye") at the receiver's comparator or slicer.

On the other hand, larger value of n typically lead to a higher pin-efficiency of the signaling scheme, wherein pin-efficiency is defined as the ratio of the transmitted bits on the n-wire interface within a clock cycle, and the number n of wires. For orthogonal differential vector signaling with binary modulation of the input values the pin-efficiency is (n−1)/n, whereas using quaternary modulation of the input values leads to a pin-efficiency of (2n−2)/n. In addition to higher pin-efficiency, orthogonal differential vector signaling has the property that the ISI-ratio as defined in [Hormati I] of the resulting signaling scheme is the same as the ISI-ratio of uncoded signals from the alphabet S. Hence, when binary modulation of the input values is used, the resulting ISI-ratio is the smallest possible value 1, representing the best possible detection capability. Using values of n that are larger than 2 is thus preferable, as this allows to achieve a higher throughput on the communication wires.

What is therefore needed is a method to optimize the vertical opening of the resulting eye diagrams in order to achieve the best possible tolerance against thermal and mismatch noise with the resulting reduced signal levels.

As will be apparent to one familiar with the art, the output result from each of the combined input value slicers or digital comparators is dependent on two signal levels; the reference or baseline level for the comparison, and the variable signal value (i.e. the combined signal level.) For descriptive purposes, the absolute value of the difference between these two levels is herein called the "detection margin" for that comparator. The detection margin can be measured, as may be done as the vertical component of a signal quality metric such as a receive eye diagram, or may be calculated or computed as part of a simulation. Larger margins are associated with more reliable results, especially if the variable input signal is accompanied by noise. Similar terms of art include "comparator overdrive" and "comparator input margin".

Increasing ODVS Eye Opening

The optimization method to increase the vertical opening of the eye diagrams corresponding to the various comparators of an orthogonal differential vector signaling code using an s-orthogonal matrix M starts by assuming that the entry j of the input vector comprises antipodal weights having values $-a_j$ and $a_j$, wherein $a_j$ is positive. We define the "initial code set" to be the set of antipodal weights represented by a vector $$(0, \pm a_2, \pm a_3, \ldots, \pm a_n) \qquad \text{[Eqn. 4]}$$

It should be noted that although the values in Eqn. 4 illustrate binary modulation for descriptive convenience, the same procedure described here is also applicable to optimization of vertical eye opening for higher-order modulation, such as PAM-X modulation of the input vectors.

The code obtained from the input set is $$(0, \pm a_2, \pm a_3, \ldots, \pm a_n) * M/\mu \qquad \text{[Eqn. 5]}$$

where $$\mu = \max_{2 \leq i \leq n} \Sigma_{j=1}^{n} |M_{ij}| a_i \qquad \text{[Eqn. 6]}$$

In other words, $\mu$ is the codeword symbol normalization constant used to ensure that the coordinates of the codewords are between $-1$ and $+1$.

The detection matrix corresponding to the vector signaling code is the matrix comprising rows $2, 3, \ldots, n$, of M wherein each sub-channel code vector is chi-normalized so that the sum of the positive entries in the row is 1. Each such sub-channel code vector corresponds to a multi-input sub-channel comparator as defined in [Holden I], and the fact that the sum of the positive entries is equal to 1 means that the sub-channel comparator (also referred to herein as a "comparator" or "multi-input comparator") does not introduce additional gain. For a real number a we define chi(a) to be equal to a if a is positive, and equal to 0 otherwise. Then the chi-normalization constant for row i of M is equal to $$\Sigma_{j=1}^{n} chi(M_{ij}). \qquad \text{[Eqn. 7]}$$

We denote by D the detection matrix corresponding to M. If L denotes the matrix comprising the rows $2, 3, \ldots, n$ of M, then $$D = diag(1/\Sigma_{j=1}^{n} chi(M_{2j}), \ldots, 1/\Sigma_{j=1}^{n} chi(M_{nj})) * L \qquad \text{[Eqn. 8]}$$

wherein diag( . . . ) denotes the diagonal matrix with diagonal entries given by the vector in the argument. As can be easily verified by anyone of moderate skill in the art, application of the multi-input sub-channel comparators leads to the values $$\pm \frac{a_2 s_2}{\mu \sum_{j=1}^{n} chi(M_{2j})}, \pm \frac{a_3 s_3}{\mu \sum_{j=1}^{n} chi(M_{3j})}, \ldots, \pm \frac{a_n s_n}{\mu \sum_{j=1}^{n} chi(M_{nj})}, \qquad \text{[Eqn. 9]}$$

wherein $s_i$ is the squared Euclidean norm of the i-th row of M. The goal is to maximize the minimum of the absolute values of the above expressions.

To check whether this maximum is greater than or equal to a given vertical opening threshold $\delta$, the following Basic Linear Program (BLP) needs to be solved:

Maximize $$a_2 + \ldots + a_n \qquad \text{[Eqn. 10]}$$

Subject to:

For all $1 \leq j \leq n, 2 \leq i \leq n: a_i s_i \geq \delta * \Sigma_{l=2}^{n} |M_{lj}| a_l * \Sigma_{k=1}^{n} chi(M_{ik}) \qquad \text{[Eqn. 11]}$ And For all $2 \leq i \leq n: a_i \geq 0 \qquad \text{[Eqn. 12]}$ If this BLP is feasible, then the maximum vertical opening threshold is at least $\delta$, and if not, it is definitely strictly smaller than $\delta$. The optimal value of the vertical opening can then be found using a binary search on $\delta$. At each step of the binary search the BLP needs to be solved for the particular value of $\delta$ relevant in that step.

EXAMPLES

As a first example embodiment, we start with the case n=3. In this case the only possible choice for the scaled-orthogonal matrix M (up to a permutation of rows/columns and scaling of rows) is $$M = \begin{pmatrix} 1 & 1 & 1 \\ 1 & -1 & 0 \\ 1 & 1 & -2 \end{pmatrix} \qquad \text{[Eqn. 13]}$$

and the corresponding detection matrix is $$D = \begin{pmatrix} 1 & -1 & 0 \\ \frac{1}{2} & \frac{1}{2} & -1 \end{pmatrix} \qquad \text{[Eqn. 14]}$$

Using standard binary modulation of the initial code set, the resulting codewords would equal $\pm(1,0,-1)$, $\pm(0,1,-1)$. Applying the detection matrix of Eqn. 14 at the receiver, the first receive sub-channel comparator will generate a comparator output value of $\pm 1$ while the second receive sub-channel comparator will generate a comparator output value of $\pm 3/2$. As the lesser of the two values limits the overall signal to noise limit, the reduction of vertical eye opening compared to differential signaling is therefore $20*\log_{10}(2/1) = \sim 6$ dB. Applying the procedure above, the optimal initial code set (i.e. the optimal set of antipodal weights) is the set $(0, \pm 3/5, \pm 2/5)$ which leads to the resulting codewords $\pm(1,-1/5,-4/5), \pm(-1/5,1,-4/5)$. One embodiment of a driver generating these signal levels is shown as FIG. 9.

Applying the detection matrix of Eqn. 14 to this code, it may be observed that both sub-channel comparators will now generate comparator output values of ±6/5, providing an increase in vertical eye opening compared to the previous case of $20*\log_{10}(1.2/1)=\sim1.58$ dB. As an additional benefit, the termination power (total power required for transmission) using these modified signal levels is less than that of the previous ternary code.

In a second example embodiment, n=5 and the matrix M is $$M = \begin{pmatrix} 1 & 1 & 1 & 1 & 1 \\ 1 & -1 & 0 & 0 & 0 \\ 0 & 0 & 1 & -1 & 0 \\ 1 & 1 & -1 & -1 & 0 \\ 1 & 1 & 1 & 1 & -4 \end{pmatrix} \quad \text{[Eqn. 15]}$$

with a corresponding detection matrix of $$\begin{pmatrix} 1 & -1 & 0 & 0 & 0 \\ 0 & 0 & 1 & -1 & 0 \\ 1/2 & 1/2 & -1/2 & -1/2 & 0 \\ 1/4 & 1/4 & 1/4 & 1/4 & -1 \end{pmatrix} \quad \text{[Eqn. 16]}$$

Using standard binary modulation of the initial code set, the resulting code has an alphabet of size 6 comprising the elements 1, ¾, ¼, –¾, –1. Applying the detection matrix of Eqn. 16, it may be seen that the first three comparators generate comparator output values of ±½, whereas the fourth comparator generates comparator output values of ±5/4. The loss in vertical eye opening compared to differential signaling is therefore $20*\log_{10}(2/0.5)=\sim12$ dB.

Applying the procedure above, the optimal initial code set is calculated to be (0, ±5/12, ±5/12, ±5/12, ±1/6) and the corresponding code is shown in Table 1. One embodiment of a driver generating these signal levels is shown as FIG. 10.

TABLE 1

| | |
|---|---|
| ±[1, 1/6, 1/6, –2/3, –2/3] | ±[1/6, –2/3, 1, 1/6, –2/3] |
| ±[1/6, 1, 1/6, –2/3, –2/3] | ±[–2/3, 1/6, 1, 1/6, –2/3] |
| ±[1, 1/6, –2/3, 1/6, –2/3] | ±[1/6, –2/3, 1/6, 1, –2/3] |
| ±[1/6, 1, –2/3, 1/6, –2/3] | ±[–2/3, 1/6, 1/6, 1, –2/3] |

As may be seen, when using this code with the detection matrix of Eqn. 16 all four comparators generate comparator output values of ±⅚. The increase in vertical eye opening compared to the previous code is $20*\log_{10}(5/3)=\sim4.43$ dB. As the termination power of this code is a factor of 10/9 worse than the previous code, one may wish to normalize these results to the same termination power as the original code, in which case the new code still has a vertical eye opening that is 1.581 dB better than the vertical eye opening of the original code.

In a third example embodiment, n=6 and the matrix M is $$M = \begin{pmatrix} 1 & 1 & 1 & 1 & 1 & 1 \\ 1 & -1 & 0 & 0 & 0 & 0 \\ 0 & 0 & 1 & -1 & 0 & 0 \\ 0 & 0 & 0 & 0 & 1 & -1 \\ 1 & 1 & -1 & -1 & 0 & 0 \\ 1 & 1 & 1 & 1 & -2 & -2 \end{pmatrix} \quad \text{[Eqn. 17]}$$

with a corresponding detection matrix of $$\begin{pmatrix} 1 & -1 & 0 & 0 & 0 & 0 \\ 0 & 0 & 1 & -1 & 0 & 0 \\ 0 & 0 & 0 & 0 & 1 & -1 \\ 1/2 & 1/2 & -1/2 & -1/2 & 0 & 0 \\ 1/4 & 1/4 & 1/4 & 1/4 & -1/2 & -1/2 \end{pmatrix} \quad \text{[Eqn. 18]}$$

Using standard binary modulation of the initial code set the result, herein called the 5b6w_4_5_1 code, has an alphabet of size 4 comprising the elements 1, ⅓, –⅓, –1 and its codewords are shown in Table 2.

TABLE 2

| | |
|---|---|
| ±[1, 1/3, 1/3, –1/3, –1/3, –1] | ±[1/3, –1/3, 1, 1/3, –1/3, –1] |
| ±[1/3, 1, 1/3, –1/3, –1/3, –1] | ±[–1/3, 1/3, 1, 1/3, –1/3, –1] |
| ±[1, 1/3, –1/3, 1/3, –1/3, –1] | ±[1/3, –1/3, 1/3, 1, –1/3, –1] |
| ±[1/3, 1, –1/3, 1/3, –1/3, –1] | ±[–1/3, 1/3, 1/3, 1, –1/3, –1] |
| ±[1, 1/3, 1/3, –1/3, –1, –1/3] | ±[1/3, –1/3, 1, 1/3, –1, –1/3] |
| ±[1/3, 1, 1/3, –1/3, –1, –1/3] | ±[–1/3, 1/3, 1, 1/3, –1, –1/3] |
| ±[1, 1/3, –1/3, 1/3, –1, –1/3] | ±[1/3, –1/3, 1/3, 1, –1, –1/3] |
| ±[1/3, 1, –1/3, 1/3, –1, –1/3] | ±[–1/3, 1/3, 1/3, 1, –1, –1/3] |

When this code is detected using the detection matrix of Eqn. 18, the first four comparators generate comparator output values of ±⅔, whereas the fifth comparator generates a comparator output value of ±1. The loss in vertical eye opening compared to differential signaling is therefore $20*\log_{10}(3)=\sim9.5$ dB. Applying the procedure above, the optimal initial code set is calculated to be (0, ±⅜, ±⅜, ±½, ±⅜, ±¼) and the corresponding code has an alphabet of size 7 given by 1, ½, ¼, 0, –¼, –½, –1. The codewords of this new code herein called 5b6w_7_5_1 code are shown in Table 3. One embodiment of a driver generating these signal levels is shown as FIG. 11.

TABLE 3

| | |
|---|---|
| ±[1, 1/4, 1/4, –1/2, 0, –1] | ±[1/4, –1/2, 1, 1/4, 0, –1] |
| ±[1/4, 1, 1/4, –1/2, 0, –1] | ±[–1/2, 1/4, 1, 1/4, 0, –1] |
| ±[1, 1/4, –1/2, 1/4, 0, –1] | ±[1/4, –1/2, 1/4, 1, 0, –1] |
| ±[1/4, 1, –1/2, 1/4, 0, –1] | ±[–1/2, 1/4, 1/4, 1, 0, –1] |
| ±[1, 1/4, 1/4, –1/2, –1, 0] | ±[1/4, –1/2, 1, 1/4, –1, 0] |
| ±[1/4, 1, 1/4, –1/2, –1, 0] | ±[–1/2, 1/4, 1, 1/4, –1, 0] |
| ±[1, 1/4, –1/2, 1/4, –1, 0] | ±[1/4, –1/2, 1/4, 1, –1, 0] |
| ±[1/4, 1, –1/2, 1/4, –1, 0] | ±[–1/2, 1/4, 1/4, 1, –1, 0] |

Using this new code with the detection matrix of Eqn. 18, all comparators except for the third generate comparator output values of ±¾ and the third comparator generates a comparator output value of ±1. The increase in vertical eye opening compared to the previous code is $20*\log 10((¾)/(⅔))=\sim1$ dB. The termination power of the 5b6w_7_5_1 code is about 97% of the termination power of 5b6w_4_5_1 code, so even at a smaller termination power, 5b6w_7_5_1 leads to a bigger vertical eye opening.

In a fourth example embodiment, n=6 and the matrix M is $$M = \begin{pmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & -1 & -1 & -1 \end{pmatrix} \quad [\text{Eqn. 19}]$$

with a corresponding detection matrix of $$\begin{pmatrix} 1 & -1 & 0 & 0 & 0 & 0 \\ 1/2 & 1/2 & -1 & 0 & 0 & 0 \\ 0 & 0 & 0 & 1 & -1 & 0 \\ 0 & 0 & 0 & 1/2 & 1/2 & -1 \\ 1/3 & 1/3 & 1/3 & -1/3 & -1/3 & -1/3 \end{pmatrix}. \quad [\text{Eqn. 20}]$$

Using standard binary modulation of the initial code set, the resulting code has an alphabet of size 4 comprising the elements 1, 1/3, -1/3, -1 and is herein called the 5b6w_4_5_2 code, with its codewords shown in Table 4.

TABLE 4

| | |
|---|---|
| ±[1, 1/3, -1/3, 1/3, -1/3, -1] | ±[1, 1/3, -1/3, -1/3, -1, 1/3] |
| ±[1/3, 1, -1/3, 1/3, -1/3, -1] | ±[1/3, 1, -1/3, -1/3, -1, 1/3] |

TABLE 4-continued

| | |
|---|---|
| ±[1/3, -1/3, 1, 1/3, -1/3, -1] | ±[1/3, -1/3, 1, -1/3, -1, 1/3] |
| ±[-1/3, 1/3, 1, 1/3, -1/3, -1] | ±[-1/3, 1/3, 1, -1/3, -1, 1/3] |
| ±[1, 1/3, -1/3, -1/3, 1/3, -1] | ±[1, 1/3, -1/3, -1, -1/3, 1/3] |
| ±[1/3, 1, -1/3, -1/3, 1/3, -1] | ±[1/3, 1, -1/3, -1, -1/3, 1/3] |
| ±[1/3, -1/3, 1, -1/3, 1/3, -1] | ±[1/3, -1/3, 1, -1, -1/3, 1/3] |
| ±[-1/3, 1/3, 1, -1/3, 1/3, -1] | ±[-1/3, 1/3, 1, -1, -1/3, 1/3] |

With this code and the detection matrix of Eqn. 20, it may be observed that comparators 1, 3, and 5 generate comparator output values of ±2/3, whereas comparators 2 and 4 generate comparator output values of ±1. The loss in vertical eye opening compared to differential signaling is therefore $20*\log_{10}(3) = \sim9.5$ dB. Applying the procedure above, the optimal initial code set is calculated to be (0, ±3/8, ±1/4, ±3/8, ±1/4, ±3/8) with the corresponding code having an alphabet of size 10 given by (1, 7/8, 1/2, 1/4, 1/8, -1/8, -1/4, -1/2, -7/8, -1). The resulting codewords are shown in Table 5, with the new code herein called the 5b6w_10_5 code. One embodiment of a driver generating these signal levels is shown as FIG. 12.

TABLE 5

| | |
|---|---|
| ±[1, 1/4, -1/8, 1/4, -1/2, -7/8] | ±[1, 1/4, -1/8, -1/4, -1, 1/8] |
| ±[1/4, 1, -1/8, 1/4, -1/2, -7/8] | ±[1/4, 1, -1/8, -1/4, -1, 1/8] |
| ±[1/2, -1/4, 7/8, 1/4, -1/2, -7/8] | ±[1/2, -1/4, 7/8, -1/4, -1, 1/8] |
| ±[-1/4, 1/2, 7/8, 1/4, -1/2, -7/8] | ±[-1/4, 1/2, 7/8, -1/4, -1, 1/8] |
| ±[1, 1/4, -1/8, -1/2, 1/4, -7/8] | ±[1, 1/4, -1/8, -1, -1/4, 1/8] |
| ±[1/4, 1, -1/8, -1/2, 1/4, -7/8] | ±[1/4, 1, -1/8, -1, -1/4, 1/8] |
| ±[1/2, -1/4, 7/8, -1/2, 1/4, -7/8] | ±[1/2, -1/4, 7/8, -1, -1/4, 1/8] |
| ±[-1/4, 1/2, 7/8, -1/2, 1/4, -7/8] | ±[-1/4, 1/2, 7/8, -1, -1/4, 1/8] |

For this code all comparators generate comparator output values of ±3/4. The increase in vertical eye opening compared to 5b6w_4_5_2 is $20*\log_{10}((3/4)/(2/3)) = \sim1$ dB. The termination power of 5b6w_10_5 is about 88% of the termination power of 5b6w_4_5_2, so even at a smaller termination power, 5b6w_10_5 leads to a bigger vertical eye opening.

In a fifth example embodiment n=9, and the matrix M is $$M = \begin{pmatrix} 1 & 1 & 1 & 1 & 1 & 1 & 1 & 1 & 1 \\ 1 & -1 & 0 & 0 & 0 & 0 & 0 & 0 & 0 \\ 0 & 0 & 1 & -1 & 0 & 0 & 0 & 0 & 0 \\ 0 & 0 & 0 & 0 & 1 & -1 & 0 & 0 & 0 \\ 0 & 0 & 0 & 0 & 0 & 0 & 1 & -1 & 0 \\ 1 & 1 & -1 & -1 & 0 & 0 & 0 & 0 & 0 \\ 0 & 0 & 0 & 0 & 1 & 1 & -1 & -1 & 0 \\ 1 & 1 & 1 & 1 & -1 & -1 & -1 & -1 & 0 \\ 1 & 1 & 1 & 1 & 1 & 1 & 1 & 1 & -8 \end{pmatrix} \quad [\text{Eqn. 21}]$$

with a corresponding detection matrix of $$\begin{pmatrix} 1 & -1 & 0 & 0 & 0 & 0 & 0 & 0 & 0 \\ 0 & 0 & 1 & -1 & 0 & 0 & 0 & 0 & 0 \\ 0 & 0 & 0 & 0 & 1 & -1 & 0 & 0 & 0 \\ 0 & 0 & 0 & 0 & 0 & 0 & 1 & -1 & 0 \\ 1/2 & 1/2 & -1/2 & -1/2 & 0 & 0 & 0 & 0 & 0 \\ 0 & 0 & 0 & 0 & 1/2 & 1/2 & -1/2 & -1/2 & 0 \\ 1/4 & 1/4 & 1/4 & 1/4 & -1/4 & -1/4 & -1/4 & -1/4 & 0 \\ 1/8 & 1/8 & 1/8 & 1/8 & 1/8 & 1/8 & 1/8 & 1/8 & -1 \end{pmatrix}. \quad [\text{Eqn. 22}]$$

Using standard binary modulation of the initial code set, the resulting code has an alphabet of size 7 composed of the elements (1, 1/2, 1/4, 0, -1/4, -1/2, -1). For this code all the comparators except the generate comparator output values of ±1/4 and the last comparator generates a comparator output value of ±9/8.

Applying the procedure above, the optimal initial code set is calculated to be (0,±3/10,±3/10,±3/10,±3/10,±3/10,±3/10,±3/10,±1/10) and the corresponding code has an alphabet of size 8 given by (1, 4/5, 2/5, 1/5, -1/5, -2/5, -4/5, -1). This code is herein called 8b9w_8_8 code and its codewords are shown in Table 7. One embodiment of a driver generating these signal levels is shown as FIG. 13.

Using this code with the detection matrix of Eqn. 22 all but the last comparator generate comparator output values of ±3/5, and the last generates a comparator output value of ±9/10. The increase in vertical opening compared to the non-optimized code is $20*\log_{10}((3/5)/(1/4)) = \sim7.6$ dB. The termination power of 8b9w_8_8 is about 1.9 times the termination power of the non-optimized code. At equal termination power, 8b9w_8_8 has a vertical opening that is about 2 dB better than the opening of the non-optimized code.

TABLE 7

| | |
|---|---|
| ±[1, 2/5, 2/5, −1/5, 2/5, −1/5, −1/5, −4/5, −4/5] | ±[2/5, −1/5, −1/5, −4/5, 1, 2/5, 2/5, −1/5, −4/5] |
| ±[2/5, 1, 2/5, −1/5, 2/5, −1/5, −1/5, −4/5, −4/5] | ±[−1/5, 2/5, −1/5, −4/5, 1, 2/5, 2/5, −1/5, −4/5] |
| ±[1, 2/5, −1/5, 2/5, 2/5, −1/5, −1/5, −4/5, −4/5] | ±[2/5, −1/5, −4/5, −1/5, 1, 2/5, 2/5, −1/5, −4/5] |
| ±[2/5, 1, −1/5, 2/5, 2/5, −1/5, −1/5, −4/5, −4/5] | ±[−1/5, 2/5, −4/5, −1/5, 1, 2/5, 2/5, −1/5, −4/5] |
| ±[1, 2/5, 2/5, −1/5, −1/5, 2/5, −1/5, −4/5, −4/5] | ±[2/5, −1/5, −1/5, −4/5, 2/5, 1, 2/5, −1/5, −4/5] |
| ±[2/5, 1, 2/5, −1/5, −1/5, 2/5, −1/5, −4/5, −4/5] | ±[−1/5, 2/5, −1/5, −4/5, 2/5, 1, 2/5, −1/5, −4/5] |
| ±[1, 2/5, −1/5, 2/5, −1/5, 2/5, −1/5, −4/5, −4/5] | ±[2/5, −1/5, −4/5, −1/5, 2/5, 1, 2/5, −1/5, −4/5] |
| ±[2/5, 1, −1/5, 2/5, −1/5, 2/5, −1/5, −4/5, −4/5] | ±[−1/5, 2/5, −4/5, −1/5, 2/5, 1, 2/5, −1/5, −4/5] |
| ±[1, 2/5, 2/5, −1/5, 2/5, −1/5, −4/5, −1/5, −4/5] | ±[2/5, −1/5, −1/5, −4/5, 1, 2/5, −1/5, 2/5, −4/5] |
| ±[2/5, 1, 2/5, −1/5, 2/5, −1/5, −4/5, −1/5, −4/5] | ±[−1/5, 2/5, −1/5, −4/5, 1, 2/5, −1/5, 2/5, −4/5] |
| ±[1, 2/5, −1/5, 2/5, 2/5, −1/5, −4/5, −1/5, −4/5] | ±[2/5, −1/5, −4/5, −1/5, 1, 2/5, −1/5, 2/5, −4/5] |
| ±[2/5, 1, −1/5, 2/5, 2/5, −1/5, −4/5, −1/5, −4/5] | ±[−1/5, 2/5, −4/5, −1/5, 1, 2/5, −1/5, 2/5, −4/5] |
| ±[1, 2/5, 2/5, −1/5, −1/5, 2/5, −4/5, −1/5, −4/5] | ±[2/5, −1/5, −1/5, −4/5, 2/5, 1, −1/5, 2/5, −4/5] |
| ±[2/5, 1, 2/5, −1/5, −1/5, 2/5, −4/5, −1/5, −4/5] | ±[−1/5, 2/5, −1/5, −4/5, 2/5, 1, −1/5, 2/5, −4/5] |
| ±[1, 2/5, −1/5, 2/5, −1/5, 2/5, −4/5, −1/5, −4/5] | ±[2/5, −1/5, −4/5, −1/5, 2/5, 1, −1/5, 2/5, −4/5] |
| ±[2/5, 1, −1/5, 2/5, −1/5, 2/5, −4/5, −1/5, −4/5] | ±[−1/5, 2/5, −4/5, −1/5, 2/5, 1, −1/5, 2/5, −4/5] |
| ±[2/5, −1/5, 1, 2/5, 2/5, −1/5, −1/5, −4/5, −4/5] | ±[−1/5, −4/5, 2/5, −1/5, 1, 2/5, 2/5, −1/5, −4/5] |
| ±[−1/5, 2/5, 1, 2/5, 2/5, −1/5, −1/5, −4/5, −4/5] | ±[−4/5, −1/5, 2/5, −1/5, 1, 2/5, 2/5, −1/5, −4/5] |
| ±[2/5, −1/5, 2/5, 1, 2/5, −1/5, −1/5, −4/5, −4/5] | ±[−1/5, −4/5, −1/5, 2/5, 1, 2/5, 2/5, −1/5, −4/5] |
| ±[−1/5, 2/5, 2/5, 1, 2/5, −1/5, −1/5, −4/5, −4/5] | ±[−4/5, −1/5, −1/5, 2/5, 1, 2/5, 2/5, −1/5, −4/5] |
| ±[2/5, −1/5, 1, 2/5, −1/5, 2/5, −1/5, −4/5, −4/5] | ±[−1/5, −4/5, 2/5, −1/5, 2/5, 1, 2/5, −1/5, −4/5] |
| ±[−1/5, 2/5, 1, 2/5, −1/5, 2/5, −1/5, −4/5, −4/5] | ±[−4/5, −1/5, 2/5, −1/5, 2/5, 1, 2/5, −1/5, −4/5] |
| ±[2/5, −1/5, 2/5, 1, −1/5, 2/5, −1/5, −4/5, −4/5] | ±[−1/5, −4/5, −1/5, 2/5, 2/5, 1, 2/5, −1/5, −4/5] |
| ±[−1/5, 2/5, 2/5, 1, −1/5, 2/5, −1/5, −4/5, −4/5] | ±[−4/5, −1/5, −1/5, 2/5, 2/5, 1, 2/5, −1/5, −4/5] |
| ±[2/5, −1/5, 1, 2/5, 2/5, −1/5, −4/5, −1/5, −4/5] | ±[−1/5, −4/5, 2/5, −1/5, 1, 2/5, −1/5, 2/5, −4/5] |
| ±[−1/5, 2/5, 1, 2/5, 2/5, −1/5, −4/5, −1/5, −4/5] | ±[−4/5, −1/5, 2/5, −1/5, 1, 2/5, −1/5, 2/5, −4/5] |
| ±[2/5, −1/5, 2/5, 1, 2/5, −1/5, −4/5, −1/5, −4/5] | ±[−1/5, −4/5, −1/5, 2/5, 1, 2/5, −1/5, 2/5, −4/5] |
| ±[−1/5, 2/5, 2/5, 1, 2/5, −1/5, −4/5, −1/5, −4/5] | ±[−4/5, −1/5, −1/5, 2/5, 1, 2/5, −1/5, 2/5, −4/5] |
| ±[2/5, −1/5, 1, 2/5, −1/5, 2/5, −4/5, −1/5, −4/5] | ±[−1/5, −4/5, 2/5, −1/5, 2/5, 1, −1/5, 2/5, −4/5] |
| ±[−1/5, 2/5, 1, 2/5, −1/5, 2/5, −4/5, −1/5, −4/5] | ±[−4/5, −1/5, 2/5, −1/5, 2/5, 1, −1/5, 2/5, −4/5] |
| ±[2/5, −1/5, 2/5, 1, −1/5, 2/5, −4/5, −1/5, −4/5] | ±[−1/5, −4/5, −1/5, 2/5, 2/5, 1, −1/5, 2/5, −4/5] |
| ±[−1/5, 2/5, 2/5, 1, −1/5, 2/5, −4/5, −1/5, −4/5] | ±[−4/5, −1/5, −1/5, 2/5, 2/5, 1, −1/5, 2/5, −4/5] |
| ±[1, 2/5, 2/5, −1/5, −1/5, −4/5, 2/5, −1/5, −4/5] | ±[2/5, −1/5, −1/5, −4/5, 2/5, −1/5, 1, 2/5, −4/5] |
| ±[2/5, 1, 2/5, −1/5, −1/5, −4/5, 2/5, −1/5, −4/5] | ±[−1/5, 2/5, −1/5, −4/5, 2/5, −1/5, 1, 2/5, −4/5] |
| ±[1, 2/5, −1/5, 2/5, −1/5, −4/5, 2/5, −1/5, −4/5] | ±[2/5, −1/5, −4/5, −1/5, 2/5, −1/5, 1, 2/5, −4/5] |
| ±[2/5, 1, −1/5, 2/5, −1/5, −4/5, 2/5, −1/5, −4/5] | ±[−1/5, 2/5, −4/5, −1/5, 2/5, −1/5, 1, 2/5, −4/5] |
| ±[1, 2/5, 2/5, −1/5, −4/5, −1/5, 2/5, −1/5, −4/5] | ±[2/5, −1/5, −1/5, −4/5, −1/5, 2/5, 1, 2/5, −4/5] |
| ±[2/5, 1, 2/5, −1/5, −4/5, −1/5, 2/5, −1/5, −4/5] | ±[−1/5, 2/5, −1/5, −4/5, −1/5, 2/5, 1, 2/5, −4/5] |
| ±[1, 2/5, −1/5, 2/5, −4/5, −1/5, 2/5, −1/5, −4/5] | ±[2/5, −1/5, −4/5, −1/5, −1/5, 2/5, 1, 2/5, −4/5] |
| ±[2/5, 1, −1/5, 2/5, −4/5, −1/5, 2/5, −1/5, −4/5] | ±[−1/5, 2/5, −4/5, −1/5, −1/5, 2/5, 1, 2/5, −4/5] |
| ±[1, 2/5, 2/5, −1/5, −1/5, −4/5, −1/5, 2/5, −4/5] | ±[2/5, −1/5, −1/5, −4/5, 2/5, −1/5, 2/5, 1, −4/5] |
| ±[2/5, 1, 2/5, −1/5, −1/5, −4/5, −1/5, 2/5, −4/5] | ±[−1/5, 2/5, −1/5, −4/5, 2/5, −1/5, 2/5, 1, −4/5] |
| ±[1, 2/5, −1/5, 2/5, −1/5, −4/5, −1/5, 2/5, −4/5] | ±[2/5, −1/5, −4/5, −1/5, 2/5, −1/5, 2/5, 1, −4/5] |
| ±[2/5, 1, −1/5, 2/5, −1/5, −4/5, −1/5, 2/5, −4/5] | ±[−1/5, 2/5, −4/5, −1/5, 2/5, −1/5, 2/5, 1, −4/5] |
| ±[1, 2/5, 2/5, −1/5, −4/5, −1/5, −1/5, 2/5, −4/5] | ±[2/5, −1/5, −1/5, −4/5, −1/5, 2/5, 2/5, 1, −4/5] |
| ±[2/5, 1, 2/5, −1/5, −4/5, −1/5, −1/5, 2/5, −4/5] | ±[−1/5, 2/5, −1/5, −4/5, −1/5, 2/5, 2/5, 1, −4/5] |
| ±[1, 2/5, −1/5, 2/5, −4/5, −1/5, −1/5, 2/5, −4/5] | ±[2/5, −1/5, −4/5, −1/5, −1/5, 2/5, 2/5, 1, −4/5] |
| ±[2/5, 1, −1/5, 2/5, −4/5, −1/5, −1/5, 2/5, −4/5] | ±[−1/5, 2/5, −4/5, −1/5, −1/5, 2/5, 2/5, 1, −4/5] |
| ±[2/5, −1/5, 1, 2/5, −1/5, −4/5, 2/5, −1/5, −4/5] | ±[−1/5, −4/5, 2/5, −1/5, 2/5, −1/5, 1, 2/5, −4/5] |
| ±[−1/5, 2/5, 1, 2/5, −1/5, −4/5, 2/5, −1/5, −4/5] | ±[−4/5, −1/5, 2/5, −1/5, 2/5, −1/5, 1, 2/5, −4/5] |
| ±[2/5, −1/5, 2/5, 1, −1/5, −4/5, 2/5, −1/5, −4/5] | ±[−1/5, −4/5, −1/5, 2/5, 2/5, −1/5, 1, 2/5, −4/5] |
| ±[−1/5, 2/5, 2/5, 1, −1/5, −4/5, 2/5, −1/5, −4/5] | ±[−4/5, −1/5, −1/5, 2/5, 2/5, −1/5, 1, 2/5, −4/5] |
| ±[2/5, −1/5, 1, 2/5, −4/5, −1/5, 2/5, −1/5, −4/5] | ±[−1/5, −4/5, 2/5, −1/5, −1/5, 2/5, 1, 2/5, −4/5] |
| ±[−1/5, 2/5, 1, 2/5, −4/5, −1/5, 2/5, −1/5, −4/5] | ±[−4/5, −1/5, 2/5, −1/5, −1/5, 2/5, 1, 2/5, −4/5] |
| ±[2/5, −1/5, 2/5, 1, −4/5, −1/5, 2/5, −1/5, −4/5] | ±[−1/5, −4/5, −1/5, 2/5, −1/5, 2/5, 1, 2/5, −4/5] |
| ±[−1/5, 2/5, 2/5, 1, −4/5, −1/5, 2/5, −1/5, −4/5] | ±[−4/5, −1/5, −1/5, 2/5, −1/5, 2/5, 1, 2/5, −4/5] |
| ±[2/5, −1/5, 1, 2/5, −1/5, −4/5, −1/5, 2/5, −4/5] | ±[−1/5, −4/5, 2/5, −1/5, 2/5, −1/5, 2/5, 1, −4/5] |
| ±[−1/5, 2/5, 1, 2/5, −1/5, −4/5, −1/5, 2/5, −4/5] | ±[−4/5, −1/5, 2/5, −1/5, 2/5, −1/5, 2/5, 1, −4/5] |
| ±[2/5, −1/5, 2/5, 1, −1/5, −4/5, −1/5, 2/5, −4/5] | ±[−1/5, −4/5, −1/5, 2/5, 2/5, −1/5, 2/5, 1, −4/5] |
| ±[−1/5, 2/5, 2/5, 1, −1/5, −4/5, −1/5, 2/5, −4/5] | ±[−4/5, −1/5, −1/5, 2/5, 2/5, −1/5, 2/5, 1, −4/5] |
| ±[2/5, −1/5, 1, 2/5, −4/5, −1/5, −1/5, 2/5, −4/5] | ±[−1/5, −4/5, 2/5, −1/5, −1/5, 2/5, 2/5, 1, −4/5] |
| ±[−1/5, 2/5, 1, 2/5, −4/5, −1/5, −1/5, 2/5, −4/5] | ±[−4/5, −1/5, 2/5, −1/5, −1/5, 2/5, 2/5, 1, −4/5] |
| ±[2/5, −1/5, 2/5, 1, −4/5, −1/5, −1/5, 2/5, −4/5] | ±[−1/5, −4/5, −1/5, 2/5, −1/5, 2/5, 2/5, 1, −4/5] |
| ±[−1/5, 2/5, 2/5, 1, −4/5, −1/5, −1/5, 2/5, −4/5] | ±[−4/5, −1/5, −1/5, 2/5, −1/5, 2/5, 2/5, 1, −4/5] |

Receiver Circuits

As previously mentioned, the multi-input comparator detector circuits described in [Holden I] and [Ulrich I] are advantageously utilized with the described codes. As an example, embodiments of both methods are shown in FIGS. 4-8.

Figure 4:
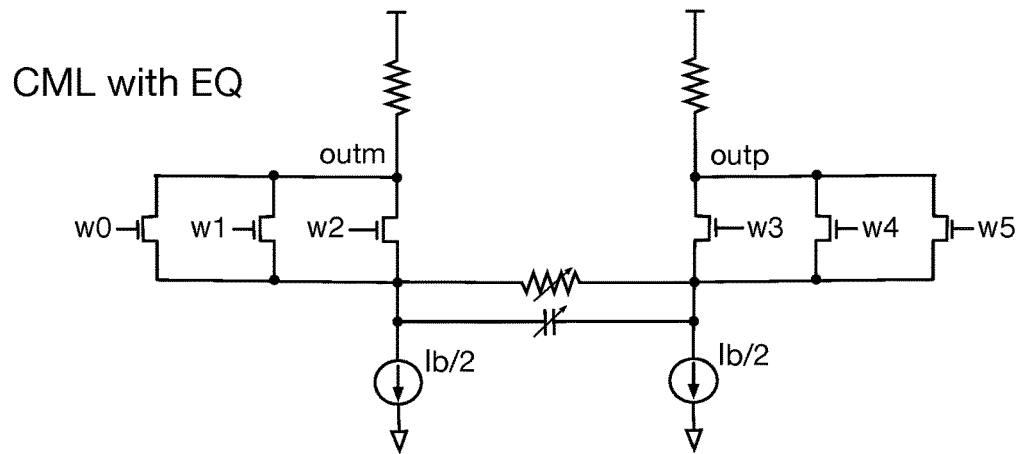
FIG. 4 illustrates two embodiments of a circuit accepting six inputs $w_0$-$w_5$ which are combined in proportions [⅓ ⅓ ⅓ −⅓ −⅓ −⅓ ] respectively, producing differential results outp and outm.
Figure 4:
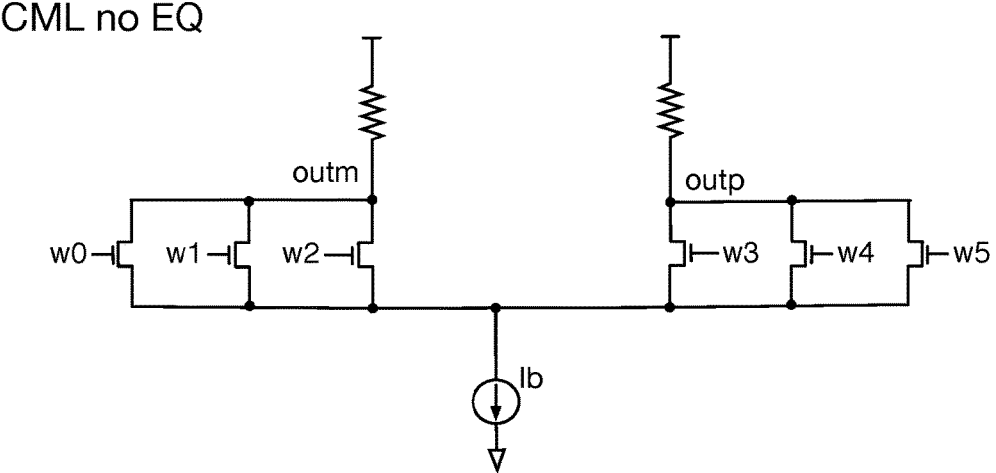

FIG. 4 illustrates two embodiments of the [Holden I] circuit accepting six inputs $w_0$-$w_5$ which are combined in proportions [⅓ ⅓ ⅓ −⅓ −⅓ −⅓ ] respectively, producing differential results outp and outm. The first embodiment incorporates high-frequency equalization via adjustable or selectable resistor/capacitor elements. The second embodiment does not provide equalization.

Figure 5:
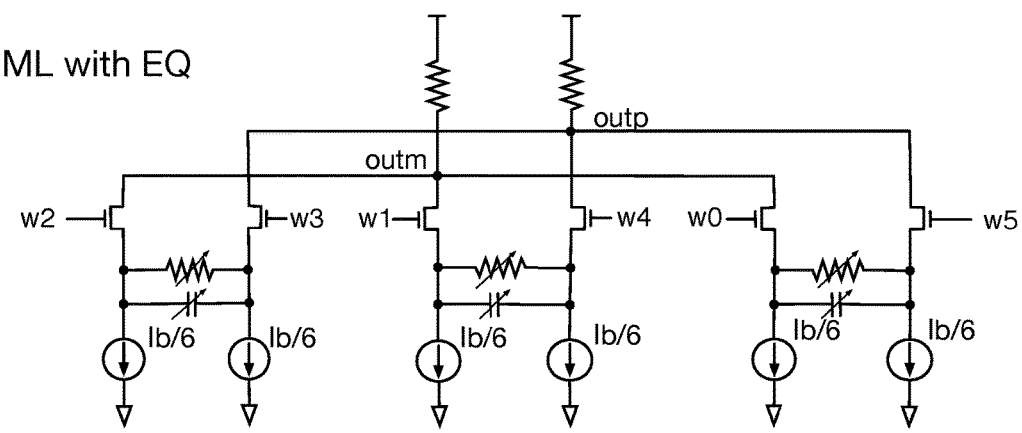
FIG. 5 shows alternative embodiments of the circuits of FIG. 4.
Figure 5:
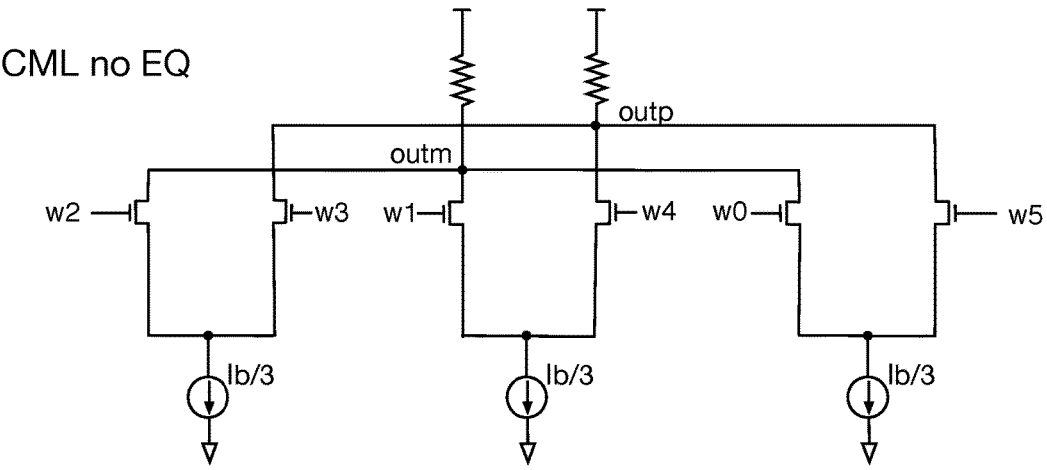

The alternative embodiment of FIG. 5 illustrates two embodiments of the [Ulrich I] circuit accepting the same six inputs $w_0, \ldots, w_5$ which are combined in proportions [⅓ ⅓ ⅓ −⅓ −⅓ −⅓ ] respectively, producing equivalent differential results outp and outm. As in FIG. 4, the first embodiment incorporates high-frequency equalization via adjustable or selectable resistor/capacitor elements, and the second embodiment does not provide equalization.

Figure 6:
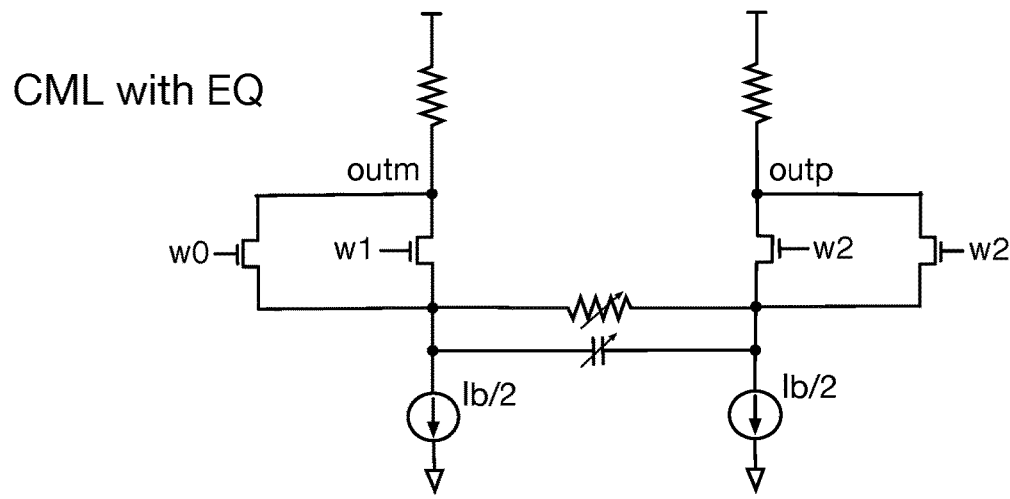
FIG. 6 illustrates two embodiments of a circuit accepting three inputs $w_0$, . . . , $w_2$ and not using the three inputs $w_3$, . . . , $w_5$ in combinations representing the proportions [½ ½ −1 0 0 0] respectively, producing differential results outp and outm.
Figure 6:
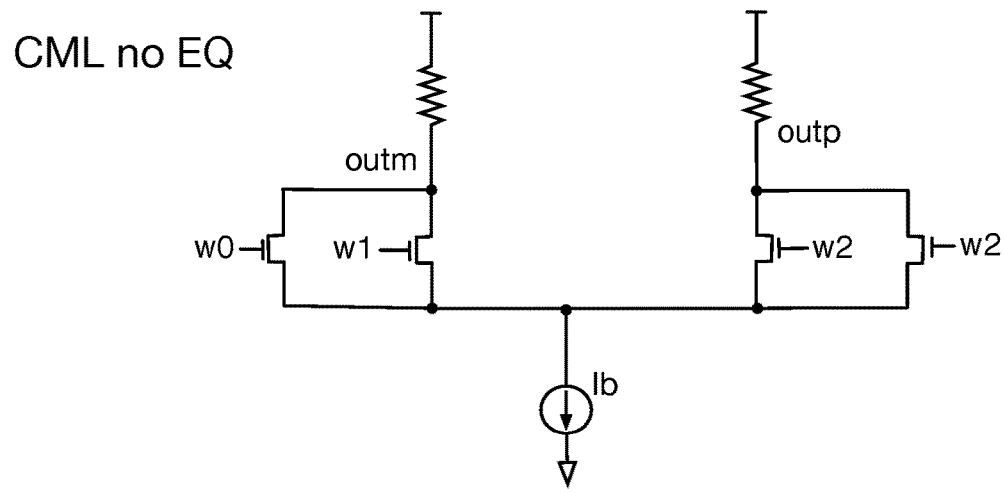

FIG. 6 illustrates two embodiments of the [Holden I] circuit accepting three inputs $w_0$-$w_2$ and not using the three inputs $w_3, \ldots, w_5$ in combinations representing the proportions [½ ½ −1 0 0 0] respectively, producing differential results outp and outm. The first embodiment incorporates high-frequency equalization via adjustable or selectable resistor/capacitor elements. The second embodiment does not provide equalization.

Figure 7:
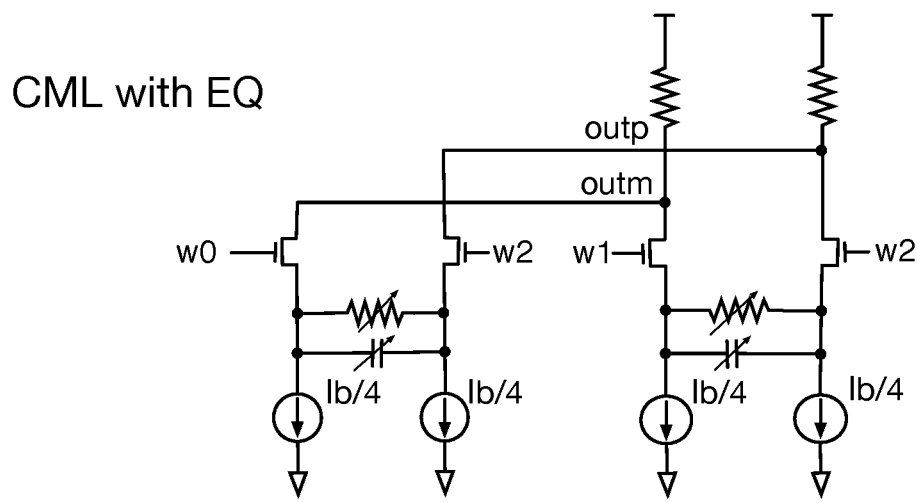
FIG. 7 shows alternative embodiments of the circuits of FIG. 6.
Figure 7:
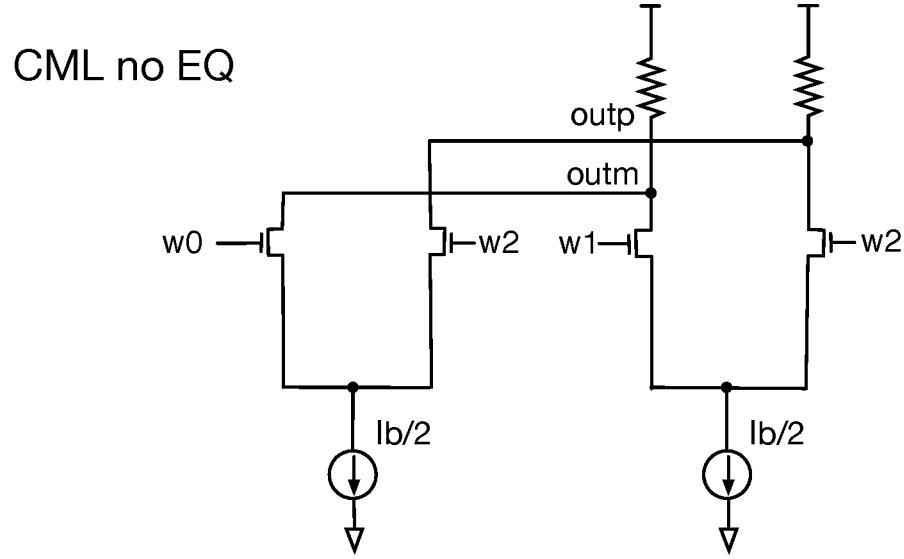

The alternative embodiment of FIG. 7 illustrates two embodiments of the [Ulrich I] circuit accepting the same inputs as FIG. 6 and producing the same producing differential results outp and outm. As in FIG. 6, the first embodiment incorporates high-frequency equalization via adjustable or selectable resistor/capacitor elements, and the second embodiment does not provide equalization.

Figure 8:
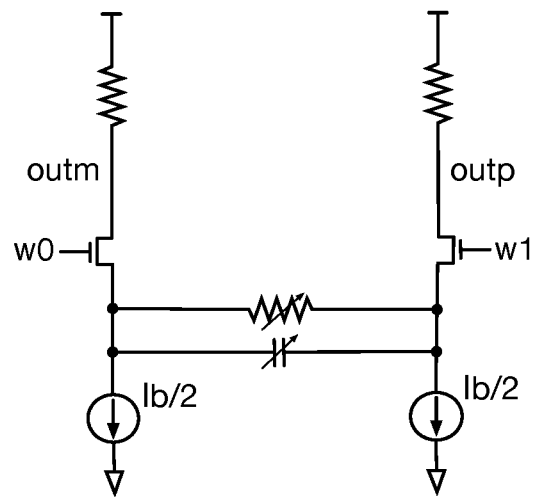
FIG. 8 illustrates two embodiments accepting two inputs $w_0$, $w_1$ and not using the four inputs $w_4$,$w_5$ in combinations representing the proportions [1 −1 0 0 0 0] respectively, producing differential results outp and outm.
Figure 8:
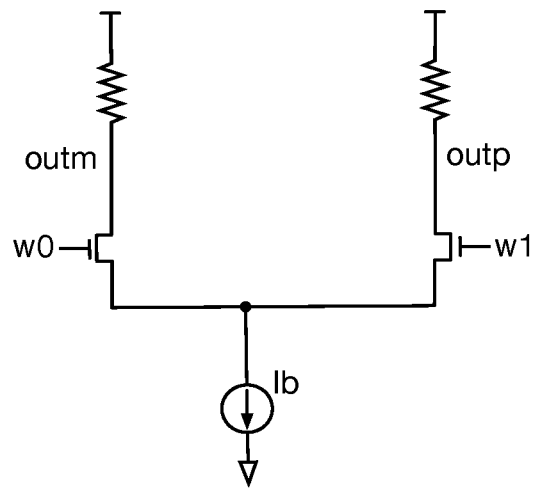

FIG. 8 illustrates two embodiments accepting two inputs $w_0, w_1$ and not using the four inputs $w_4, w_5$ in combinations representing the proportions [1 −1 0 0 0 0]respectively, producing differential results outp and outm. The first embodiment incorporates high-frequency equalization via adjustable or selectable resistor/capacitor elements. The second embodiment does not provide equalization. As one familiar with the art will note, the two circuit topologies of [Holden I] and [Ulrich I] reduce to a single differential stage in this two input case.

Driver Embodiments

Generation of the desired output signal levels described in accordance with at least one embodiment may be obtained using the driver circuit of [Ulrich II]. As specific examples of the approach, driver embodiments capable of generating the particular output signal levels associated with each of the previous examples are illustrated.

Figure 9:
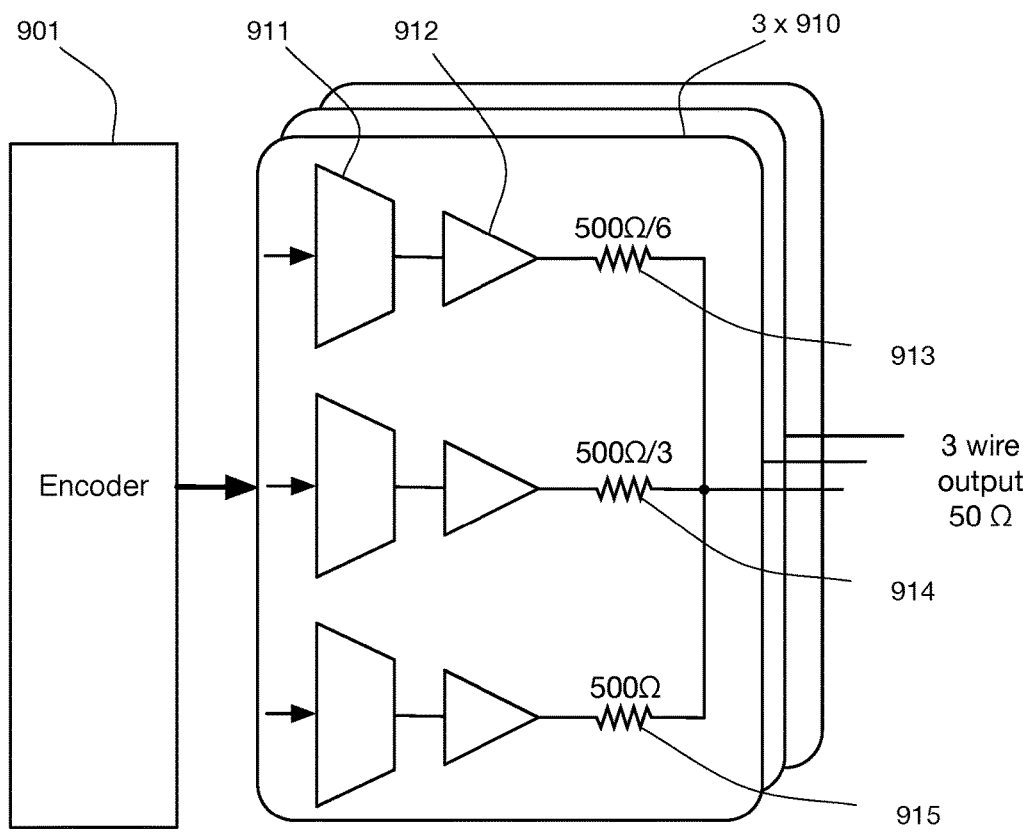
FIG. 9 shows one driver embodiment producing the optimized signal levels for a first example code ±(1,−⅕,−⅘),±(−⅕,1,−⅘).

FIG. 9 shows one driver embodiment in accordance with at least one embodiment producing the optimized signal levels determined in the first example embodiment above. Encoder 901 encodes the data to be transmitted using the matrix M of Eqn. 13, and passes the encoded control signal result to the set of output wire drivers 910. As this is a three wire code, there are three instances of 910 shown, herein called a wire driver slice, each taking the appropriate encoded element from 901 and producing the correct signal levels for its output wire.

As is common practice in high-speed communications systems, multiple processing phases may be used to increase throughput of processing-intensive operations such as encoding. Thus, digital multiplexers 911 are shown, taking the individual phase outputs and switching between them to produce a single full wire rate encoded data stream. As will be apparent to one familiar with the art, a single phase omitting the multiplexer to many phases of data supported by wider or deeper multiplexer configurations may be incorporated in this design. Subsequent driver embodiment examples incorporate the same illustrative encoder and multiplexer design, varying only in the width of the resulting output which is determined by the number of individual output wire drivers utilized.

The full wire rate encoded values are presented to digital output drivers 912 which are interconnected by series source resistors 913, 914, 915 to the common output wire producing a digitally controlled analog output. Because each of the series source resistors has a particular predetermined value, the steps produced in this digital-to-analog converter need not be identical. For the particular values illustrated in FIG. 9, the output values are shown in Table 6.

TABLE 6

| Value | Output | Comments |
|---|---|---|
| 000 | −1 | |
| 001 | −4/5 | |
| 010 | −2/5 | Not used by this code |
| 011 | −1/5 | |
| 100 | 1/5 | |
| 101 | 2/5 | Not used by this code |
| 110 | 4/5 | |
| 111 | 1 | |

Following good integrated circuit design practices, the value of resistor 913 would preferably be obtained by paralleling six 500 ohm resistors, the value of resistor 914 by paralleling three 500 ohm resistors, and the value of resistor 915 by using a single 500 ohm resistor, all resistors being of identical design, size, and composition.

As taught by [Ulrich II], multiple instances of a wire driver slice such as 910 may be also be advantageously paralleled to drive a single wire with appropriate adjusted component values in some alternative embodiments. In one such alternative embodiment, each wire driver slice 910 of FIG. 9 is replaced by, as a numeric example presented without implying a limitation, thirty-two identical wire driver slices receiving the same encoded control signal result. Because the wire driver slices are in parallel, each need drive a much smaller current into the common wire output, thus the transistors of digital drivers 912 may be smaller, and the values of series source resistors 913, 914, 915 will be in this example 32 times larger than required for a single wire driver slice, significantly simplifying implementation in an integrated circuit device.

Similarly, alternative embodiments may utilize any known encoding of the control information passing from encoder 901 through multiplexers (if used) to control digital output drivers with series source resistors, including without limitation unary or thermometer encoding and binary or other weighted-bit encoding.

Figure 10:
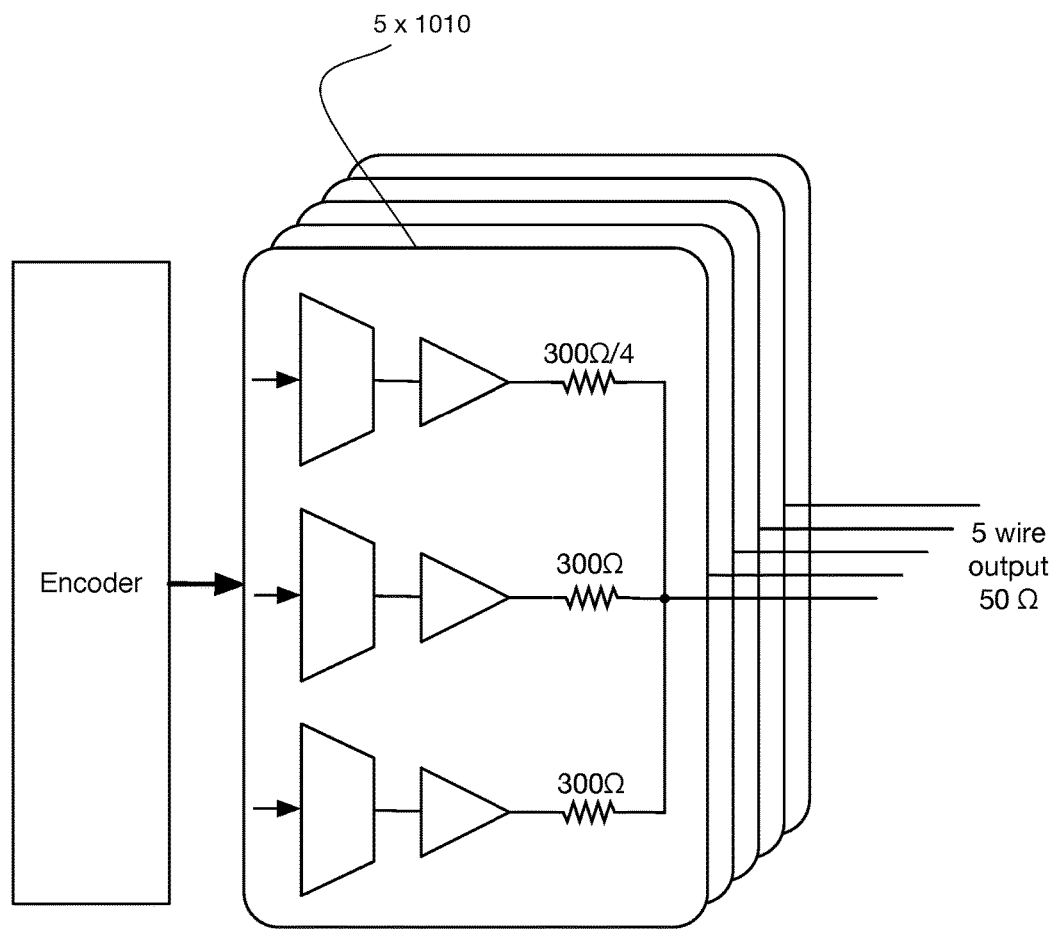
FIG. 10 shows one driver embodiment generating the signal levels of the code shown in Table 1.

The embodiment of FIG. 10 shows the same three wire driver design as the previous example, using series source resistors of 300/4 ohms, 300 ohms, and 300 ohms respectively, producing output signal levels of [−1, ⅔, ⅙, −⅙, −⅔, 1].

Figure 11:
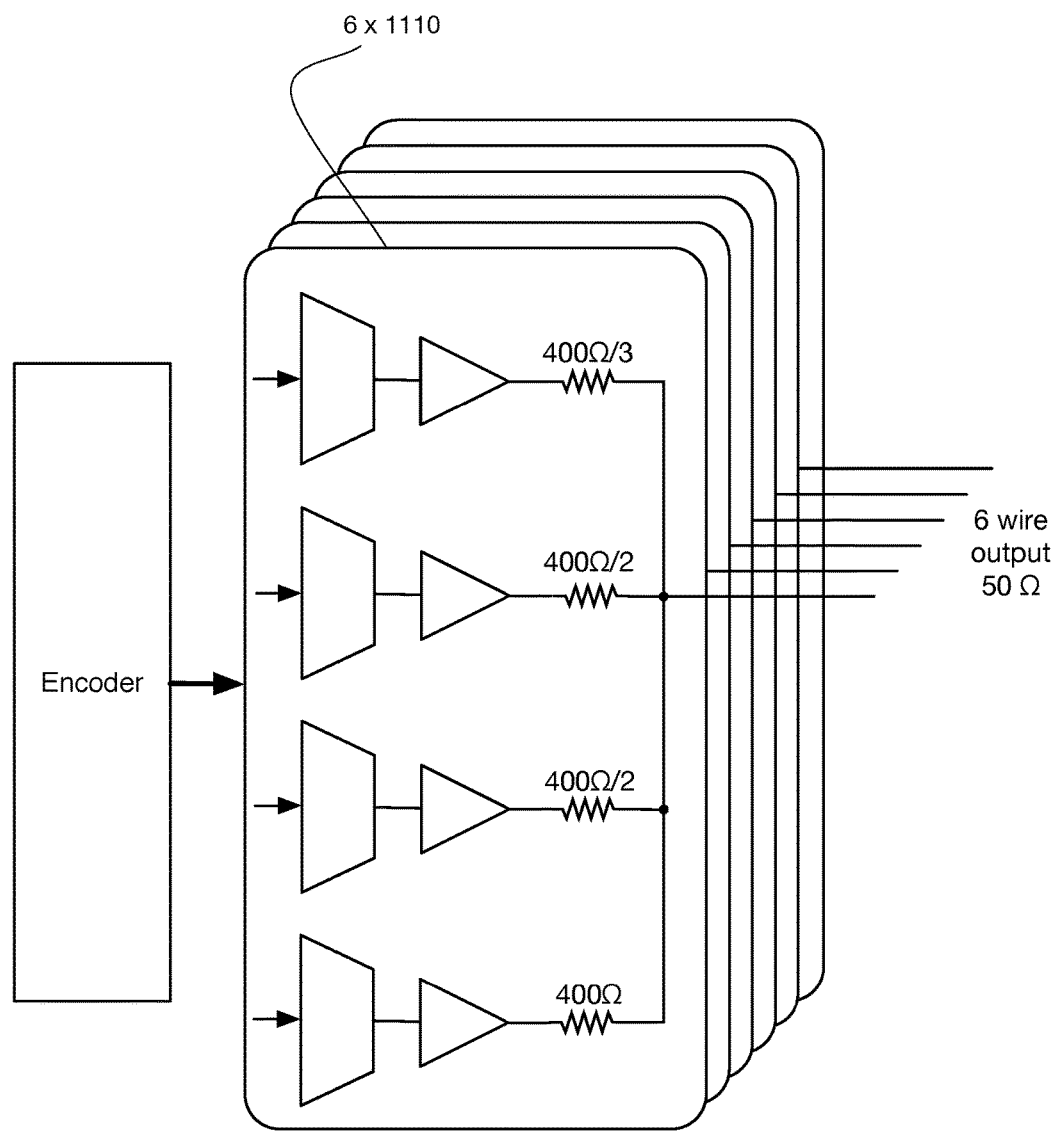
FIG. 11 shows one driver embodiment generating the signal levels of the 5b6w_7_5_1 code.

The embodiment of FIG. 11 incorporates a fourth digital output driver and series source resistor in each wire driver slice, as well as a total of six wire driver slices to drive six wire outputs with signals of [1, ½, ¼, 0, −¼, −½, 1]. The series source resistors used are 400/3 ohms, 400/2 ohms, 400/2 ohms, and 400 ohms.

Figure 12:
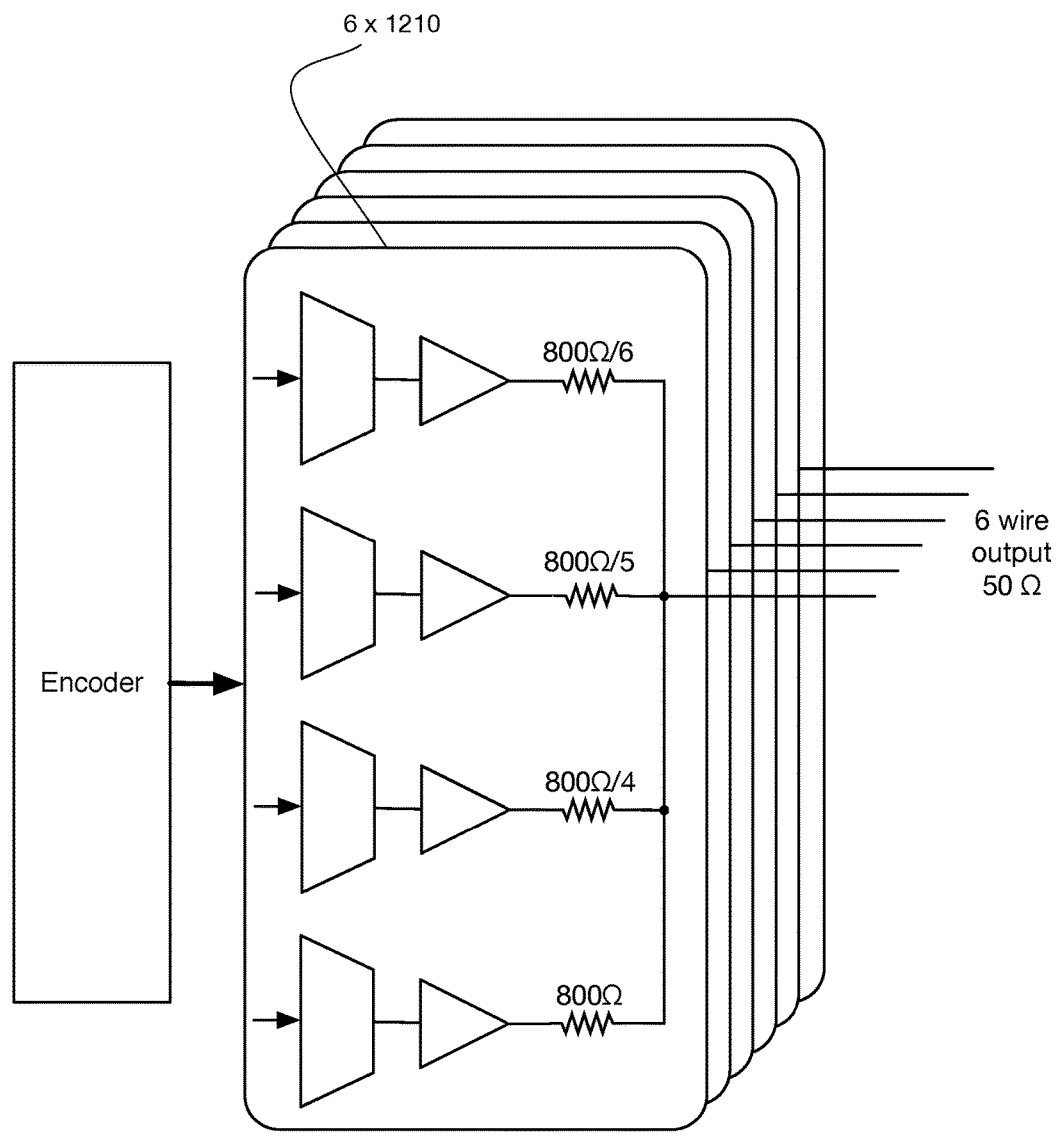
FIG. 12 shows one driver embodiment generating the signal levels of the 5b6w_10_5 code.

The embodiment of FIG. 12 also utilizes four digital output drivers per wire driver slice and six wire driver slices to drive six wires with signals of [1, ⅞, ½, ¼, ⅛, −⅛, −¼, −½, −1] using series source resistors of 800/6 ohms, 800/5 ohms, 800/4 ohms, and 800 ohms.

Figure 13:
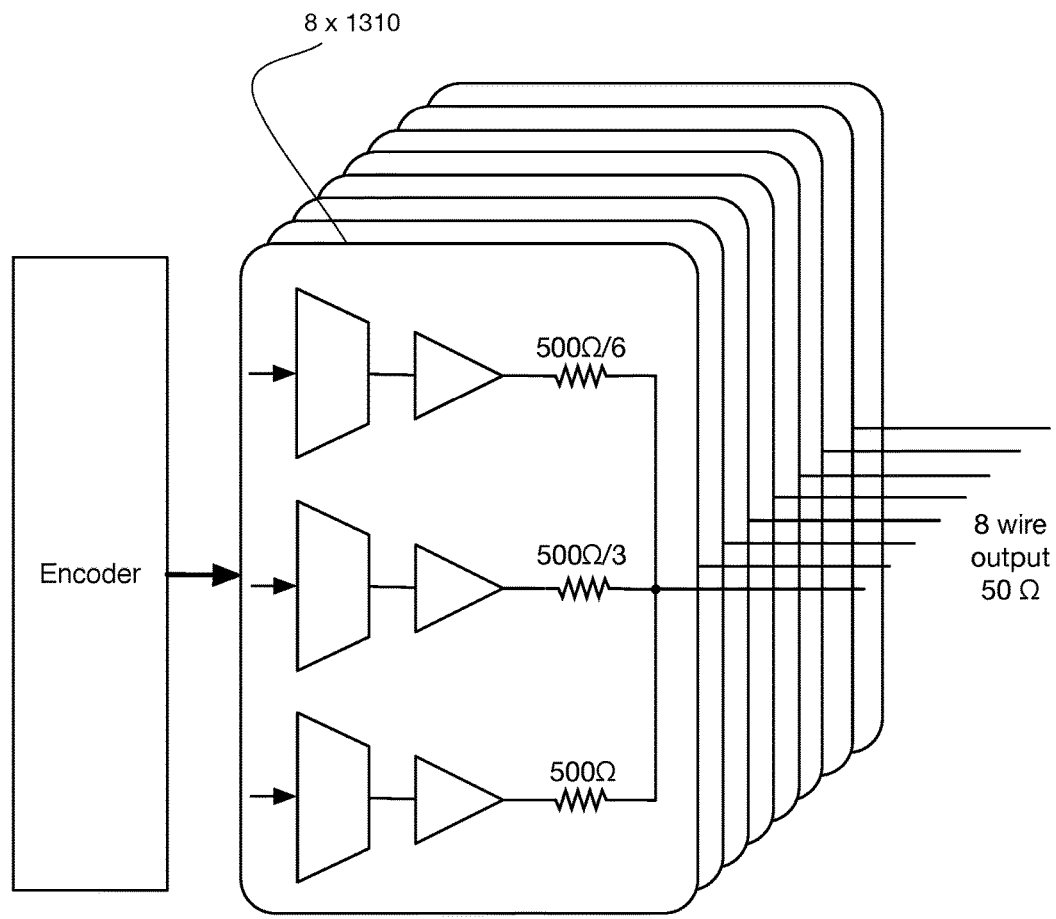
FIG. 13 shows one driver embodiment generating the signal levels of the 8b9w_8_8 code.

The embodiment of FIG. 13 utilizes only three digital output drivers per slice, but uses eight slices to drive eight wire outputs with signals of [1, ⅘, ⅖, ⅕, −⅕, −⅖, −⅘, −1] using series resistor values of 500/6 ohms, 500/3 ohms, and 500 ohms.

Embodiments

In at least one embodiment, an apparatus comprises a multi-wire bus configured to receive a set of symbols of a codeword, the set of symbols representing a weighted sum of sub-channel code vectors, each sub-channel code vector weighted according to a corresponding antipodal weight of a set of antipodal weights, the set of antipodal weight set containing at least two unique magnitudes, wherein the sub-channel code vectors are mutually orthogonal, and wherein the sub-channel code vectors form a scaled-orthogonal matrix, and a decoder, connected to the multi-wire bus, comprising a plurality of sub-channel comparators configured to generate a respective plurality of comparator output values based on the received set of symbols of the codeword, each comparator comprising a set of chi-normalized input weights, wherein each set of chi-normalized input weights is selected according to a respective sub-channel code vector, and wherein the antipodal weight set is selected such that each subchannel comparator generates antipodal values greater than a minimum value. In some embodiments, the antipodal weight set is selected such that each subchannel comparator generates antipodal values of substantially similar magnitudes.

In at least one embodiment, the set of antipodal weights comprises at least two antipodal weights having distinct magnitudes.

In at least one embodiment, each of the antipodal weights in the set of antipodal weights has a magnitude less than 1.

In at least one embodiment, the set of antipodal weights is based on a codeword symbol normalization constant, $\mu$.

In at least one embodiment, the codeword symbol normalization constant normalizes the symbols of the codeword to values having magnitudes less than or equal to 1.

In at least one embodiment, a sum of the antipodal weights in the set of antipodal weights is maximized according to the antipodal value corresponding a minimum vertical opening threshold. In at least one embodiment, the sum of the antipodal weights in the set of antipodal weights is also maximized according to the codeword symbol normalization constant $\mu$.

In at least one embodiment, the antipodal value is greater than a predetermined vertical opening threshold, $\delta$.

Figure 14:
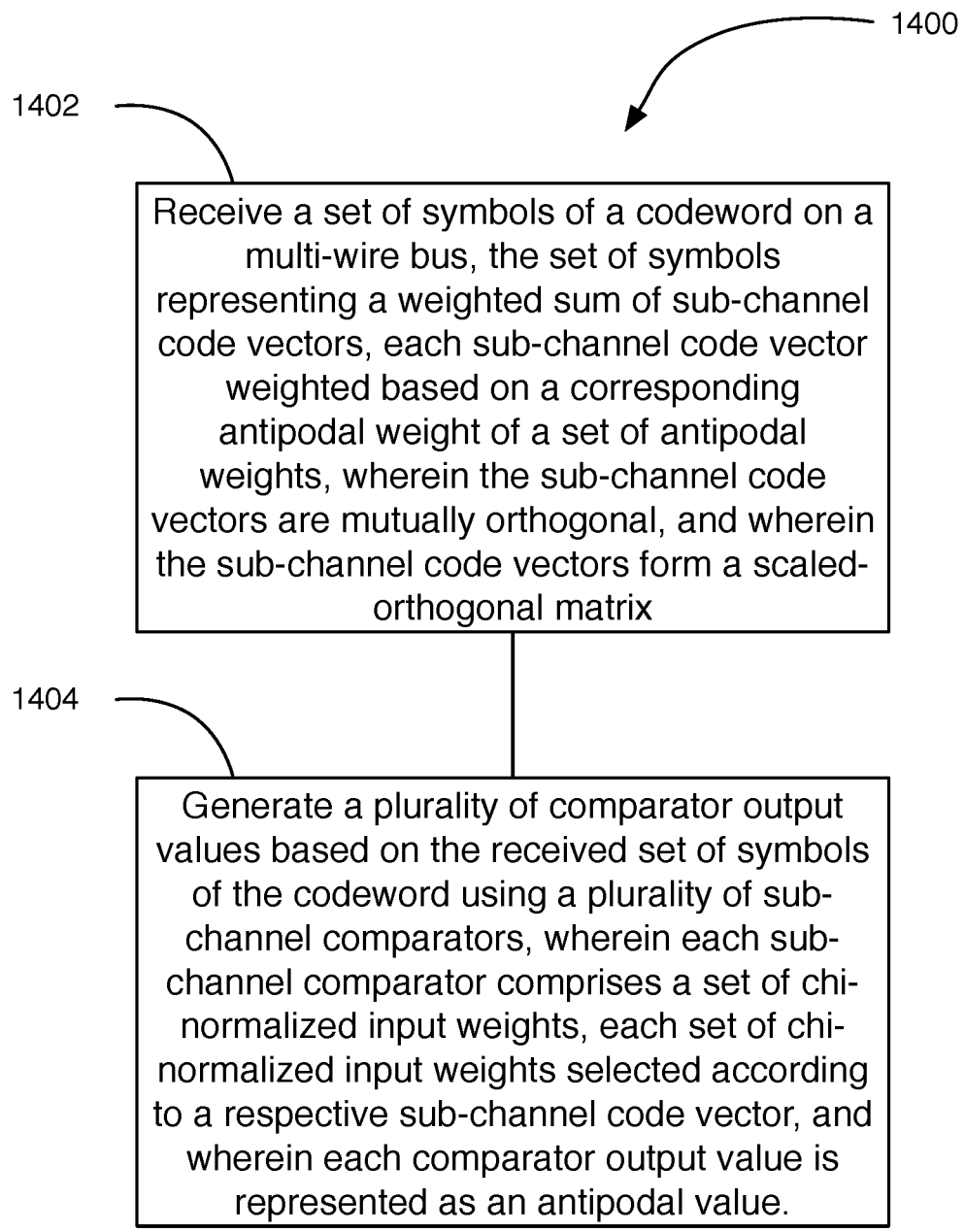
FIG. 14 shows a process in accordance with at least one embodiment.

As shown in FIG. 14, a method 1400 in accordance with at least one embodiment comprises receiving, at step 1402, a set of symbols of a codeword on a multi-wire bus, the set of symbols representing a weighted sum of sub-channel code vectors, each sub-channel code vector weighted based on a corresponding antipodal weight of a set of antipodal weights, wherein the sub-channel code vectors are mutually orthogonal, and wherein the sub-channel code vectors form a scaled-orthogonal matrix, and generating, at step 1404, a plurality of comparator output values based on the received set of symbols of the codeword using a plurality of sub-channel comparators, wherein each sub-channel comparator comprises a set of chi-normalized input weights, each set of chi-normalized input weights selected according to a respective sub-channel code vector, and wherein each comparator output value is represented as an antipodal value.

In at least one embodiment, the set of antipodal weights comprises at least two antipodal weights having distinct magnitudes.

In at least one embodiment, each of the antipodal weights in the set of antipodal weights has a magnitude less than 1.

In at least one embodiment, the set of antipodal weights is based on a codeword symbol normalization constant, $\mu$.

In at least one embodiment, the codeword symbol normalization constant t normalizes the symbols of the codeword to values having magnitudes less than or equal to 1.

In at least one embodiment, the antipodal value is greater than a predetermined vertical opening threshold, $\delta$.

Figure 15:
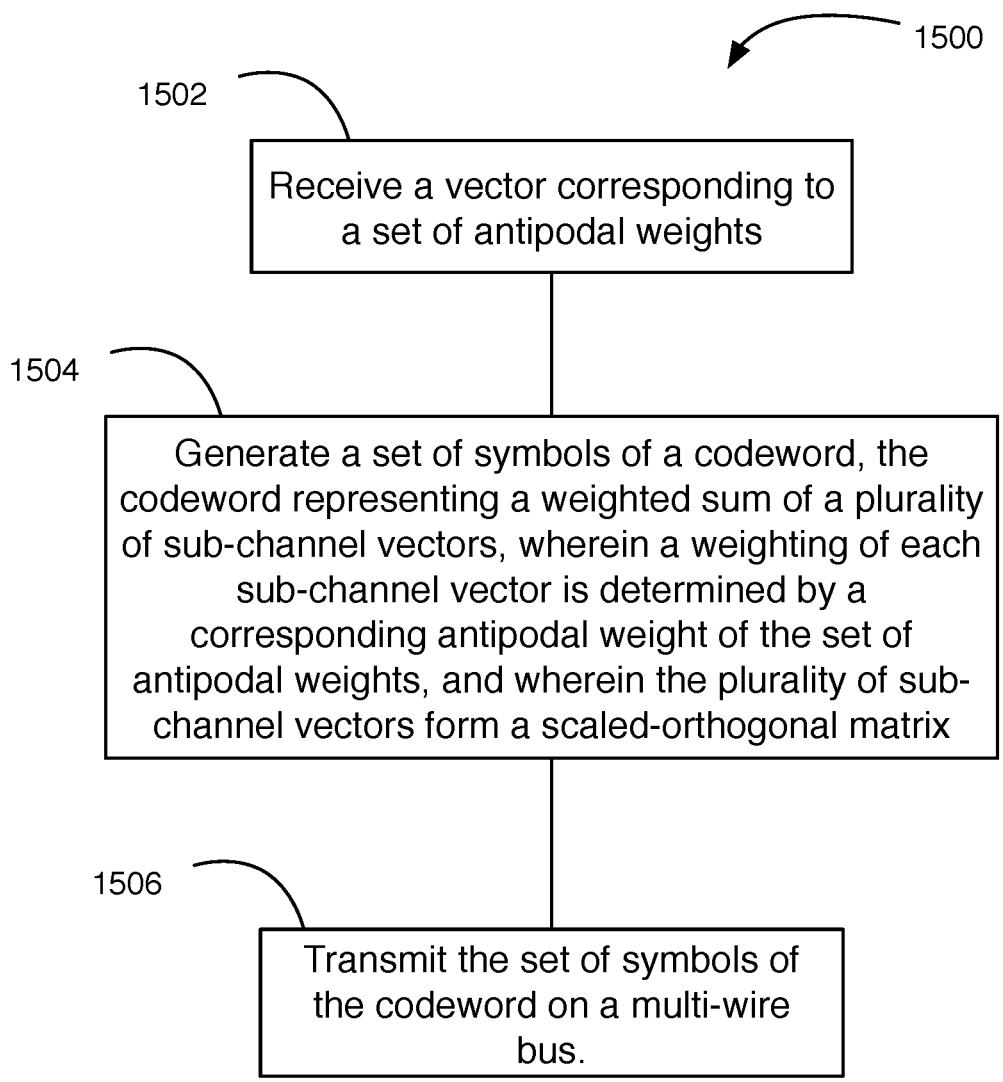
FIG. 15 shows a process in accordance with at least one embodiment.

As shown in FIG. 15, a method 1500 in accordance with at least one embodiment comprises receiving, at step 1502, a vector corresponding to a set of antipodal weights, generating, at step 1504, a set of symbols of a codeword, the codeword representing a weighted sum of a plurality of sub-channel vectors, wherein a weighting of each sub-channel vector is determined by a corresponding antipodal weight of the set of antipodal weights, and wherein the plurality of sub-channel vectors form a scaled-orthogonal matrix, and, transmitting, at step 1506, the set of symbols of the codeword on a multi-wire bus.

In at least one embodiment, the scaled-orthogonal matrix is represented as $$M = \begin{pmatrix} 1 & 1 & 1 \\ 1 & -1 & 0 \\ 1 & 1 & -2 \end{pmatrix}$$

and the vector corresponding to the set of antipodal weights is represented as $(0, \pm 3/5, \pm 2/5)$.

In at least one embodiment, the scaled-orthogonal matrix is represented as $$M = \begin{pmatrix} 1 & 1 & 1 & 1 & 1 \\ 1 & -1 & 0 & 0 & 0 \\ 0 & 0 & 1 & -1 & 0 \\ 1 & 1 & -1 & -1 & 0 \\ 1 & 1 & 1 & 1 & -4 \end{pmatrix}$$

and the vector corresponding to the set of antipodal weights is represented as $(0, \pm 5/12, \pm 5/12, \pm 5/12, \pm 1/6)$.

In at least one embodiment, the scaled-orthogonal matrix is represented as $$M = \begin{pmatrix} 1 & 1 & 1 & 1 & 1 & 1 \\ 1 & -1 & 0 & 0 & 0 & 0 \\ 0 & 0 & 1 & -1 & 0 & 0 \\ 0 & 0 & 0 & 0 & 1 & -1 \\ 1 & 1 & -1 & -1 & 0 & 0 \\ 1 & 1 & 1 & 1 & -2 & -2 \end{pmatrix}$$

and the vector corresponding to the set of antipodal weights is represented as $(0, \pm 3/8, \pm 3/8, \pm 1/2, \pm 3/8, \pm 1/4)$.

In at least one embodiment, the scaled-orthogonal matrix is represented as $$M = \begin{pmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & -1 & -1 & -1 \end{pmatrix}$$

and the vector corresponding to the set of antipodal weights is represented as $(0, \pm 3/8, \pm 1/4, \pm 3/8, \pm 1/4, \pm 3/8)$.

In at least one embodiment, the scaled-orthogonal matrix is represented as $$M = \begin{pmatrix} 1 & 1 & 1 & 1 & 1 & 1 & 1 & 1 & 1 \\ 1 & -1 & 0 & 0 & 0 & 0 & 0 & 0 & 0 \\ 0 & 0 & 1 & -1 & 0 & 0 & 0 & 0 & 0 \\ 0 & 0 & 0 & 0 & 1 & -1 & 0 & 0 & 0 \\ 0 & 0 & 0 & 0 & 0 & 0 & 1 & -1 & 0 \\ 1 & 1 & -1 & -1 & 0 & 0 & 0 & 0 & 0 \\ 0 & 0 & 0 & 0 & 1 & 1 & -1 & -1 & 0 \\ 1 & 1 & 1 & 1 & -1 & -1 & -1 & -1 & 0 \\ 1 & 1 & 1 & 1 & 1 & 1 & 1 & 1 & -8 \end{pmatrix}$$

and the vector corresponding to the set of antipodal weights is represented as $(0, \pm 3/10, \pm 3/10, \pm 3/10, \pm 3/10, \pm 3/10, \pm 3/10, \pm 3/10, \pm 1/10)$.

We claim:

1. A method comprising:
receiving a set of input bits;
generating a plurality of symbols of a codeword of a vector signaling code, the codeword representing a weighted summation of a plurality of mutually orthogonal sub-channel vectors, the plurality of mutually orthogonal sub-channel vectors weighted by a set of weights determined according to
(i) a set of chi-normalization constants and
(ii) a predetermined minimum vertical opening threshold δ, each mutually orthogonal sub-channel vector of the plurality of mutually orthogonal sub-channel vectors further weighted by a corresponding bit of the set of input bits; and transmitting each symbol of the codeword as a signal over a respective wire of a multi-wire bus.

2. The method of claim 1, wherein the set of weights comprises pairs of antipodal weights.

3. The method of claim 2, wherein at least two pairs of antipodal weights of the pairs of antipodal weights have different magnitudes.

4. The method of claim 1, wherein the symbols of the codeword comprise at least three distinct magnitudes.

5. The method of claim 1, wherein each chi-normalization constant is associated with a respective sub-channel vector of the plurality of mutually orthogonal sub-channel vectors.

6. The method of claim 1, wherein each weight of the set of weights is combined with a corresponding bit of the set of input bits to form an optimal initial code set vector.

7. The method of claim 6, wherein the optimal initial code set vector is represented as $[0\ \pm 3/8,\ \pm 3/8,\ \pm 1/2,\ \pm 3/8,\ \pm 1/4]$, and is combined with an encoding matrix M comprising the plurality of mutually orthogonal sub-channel vectors:

$$M = \begin{pmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & -1 & -1 & -1 \end{pmatrix}.$$

8. The method of claim 1, further comprising:
receiving the set of symbols of the codeword at a plurality of multi-input comparators (MICs); and
generating a plurality of comparator output values, each comparator output value generated by forming a respective weighted combination of two or more symbols of the codeword according to a respective chi-normalized sub-channel vector of a set of chi-normalized sub-channel vectors.

9. The method of claim 8, wherein each comparator output value is a respective antipodal value greater than or equal to the predetermined minimum vertical opening threshold δ.

10. The method of claim 8, wherein each comparator output value has an antipodal value equal to the predetermined minimum vertical opening threshold δ.

11. An apparatus comprising:
An encoder configured to
receive a set of input bits, and to responsively generate a plurality of symbols of a codeword of a vector signaling code, the codeword representing a weighted summation of a plurality of mutually orthogonal sub-channel vectors, the plurality of mutually orthogonal sub-channel vectors weighted by a set of weights determined according to
(i) a set of chi-normalization constants and
(ii) a predetermined minimum vertical opening threshold δ, each mutually orthogonal sub-channel vector further of the plurality of mutually orthogonal sub-channel vectors weighted by a corresponding bit of the set of input bits; and
a plurality of drivers configured to transmit each symbol of the codeword as a signal over a respective wire of a multi-wire bus.

12. The apparatus of claim 11, wherein the set of weights comprises pairs of antipodal weights.

13. The apparatus of claim 12, wherein at least two pairs of antipodal weights of the pairs of antipodal weights have different magnitudes.

14. The apparatus of claim 11, wherein the symbols of the codeword comprise at least three distinct magnitudes.

15. The apparatus of claim 11, wherein each chi-normalization constant is associated with a respective sub-channel vector of the plurality of mutually orthogonal sub-channel vectors.

16. The apparatus of claim 11, wherein each weight of the set of weights is combined with a corresponding bit of the set of input bits to form an optimal initial code set vector.

17. The apparatus of claim 16, wherein the optimal initial code set vector is represented as $[0\ \pm 3/8,\ \pm 3/8,\ \pm 1/2,\ \pm 3/8,\ \pm 1/4]$, and is combined with an encoding matrix M comprising the plurality of mutually-orthogonal sub-channel vectors:

$$M = \begin{pmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & -1 & -1 & -1 \end{pmatrix}.$$

18. The apparatus of claim 11, further comprising a plurality of multi-input comparators (MICs) configured to receive the set of symbols of the codeword, and to generate a plurality of comparator output values, each comparator output value generated by forming a respective weighted combination of two or more symbols of the codeword according to a respective chi-normalized sub-channel vector of a set of chi-normalized sub-channel vectors.

19. The apparatus of claim 18, wherein each comparator output value is a respective antipodal value greater than or equal to the predetermined minimum vertical opening threshold δ.

20. The apparatus of claim 18, wherein each comparator output value has an antipodal value equal to the predetermined minimum vertical opening threshold δ.

* * * * *